US010582716B1

(12) United States Patent
Sippy

(10) Patent No.: US 10,582,716 B1
(45) Date of Patent: Mar. 10, 2020

(54) DEUTERATED CAFFEINE AND USES THEREOF

(71) Applicant: Lennham Pharmaceuticals, Inc., Acton, MA (US)

(72) Inventor: Bradford C. Sippy, Acton, MA (US)

(73) Assignee: Lennham Pharmaceuticals, Inc., Acton, MA (US)

( * ) Notice: Subject to any disclaimer, the term of this patent is extended or adjusted under 35 U.S.C. 154(b) by 0 days.

(21) Appl. No.: 16/452,316

(22) Filed: Jun. 25, 2019

Related U.S. Application Data

(60) Provisional application No. 62/861,517, filed on Jun. 14, 2019.

(51) Int. Cl.
*A23L 2/56* (2006.01)
*A23L 27/21* (2016.01)
(Continued)

(52) U.S. Cl.
CPC .................. *A23L 2/56* (2013.01); *A23L 2/60* (2013.01); *A23L 27/2054* (2016.08); *A23L 27/21* (2016.08); *A23L 27/31* (2016.08); *A23L 27/88* (2016.08); *A23L 33/15* (2016.08); *A23L 33/175* (2016.08); *A23V 2002/00* (2013.01); *A23V 2200/33* (2013.01); *A23V 2250/0638* (2013.01); *A23V 2250/0644* (2013.01); *A23V 2250/0652* (2013.01); *A23V 2250/154* (2013.01); *A23V 2250/161* (2013.01); *A23V 2250/2108* (2013.01); *A23V 2250/705* (2013.01); *A23V 2250/706* (2013.01); *A23V 2250/708* (2013.01); *A23V 2250/7046* (2013.01); *A23V 2250/7052* (2013.01); *A23V 2250/7056* (2013.01)

(58) Field of Classification Search
CPC ........ A23L 2/56; A23L 27/2054; A23L 27/88; A23L 27/31; A23L 33/175; A23L 27/21; A23L 33/15; A23L 2/60
See application file for complete search history.

(56) References Cited

U.S. PATENT DOCUMENTS 8,187,647 B2   5/2012   Bhargava
8,632,834 B2   1/2014   Bhargava
(Continued)

OTHER PUBLICATIONS

Horning, "Effect of Deuterium Substitution on the Rate of Caffeine Metabolism", Stable Isotopes, Proceedings of the Third International Conference, 1979, pp. 379-384.*
(Continued)

*Primary Examiner* — Michele L Jacobson
*Assistant Examiner* — Changqing Li
(74) *Attorney, Agent, or Firm* — Wolf, Greenfield & Sacks, P.C.

(57) ABSTRACT

Provided herein are compositions (e.g., pharmaceutical compositions, nutraceutical compositions, foods, beverages, cosmetic compositions, diet supplements) comprising deuterated caffeine. The provided compositions may be useful for treating and/or preventing various diseases and conditions, such as obesity, causing weight loss, increasing metabolic rate, reducing appetite, increasing energy expenditure, increasing urine output, increasing sodium excretion, reducing edema, a pain disorder, apnea, hypotension, an encephalopathy, a neurological or psychiatric disorder, and an inflammatory disorder.

23 Claims, 1 Drawing Sheet

(51) Int. Cl.
  *A23L 33/15*    (2016.01)
  *A23L 33/175*   (2016.01)
  *A23L 2/60*     (2006.01)
  *A23L 27/30*    (2016.01)
  *A23L 27/20*    (2016.01)
  *A23L 27/00*    (2016.01)

(56) References Cited

U.S. PATENT DOCUMENTS

| | | | |
|---|---|---|---|
| 8,658,236 B2 | 2/2014 | Czarnik et al. | |
| 2008/0299271 A1* | 12/2008 | Inoue | A23C 3/00 426/237 |
| 2018/0086751 A1* | 3/2018 | Karanewsky | C12G 3/06 |

OTHER PUBLICATIONS

Marturana Here's How Much Caffeine Is in a Cup of Coffee [Online], published Feb. 2017, [retrieved on 2019-1002]. Retrieved from the Internet: <URL: https://www.self.com/story/heres-how-much-caffeine-is-in-a-cup-of-coffee>.*

[No Author Listed], Caffeine-(trimethyl-$d_9$). Sigma-Aldrich. 2 pages.

[No Author Listed], Caffeine. Dermstore.com. https://www.dermstore.com/profile_Caffeine_503552.htm [last accessed Jul. 22, 2019], 8 pages.

[No Author Listed], CAFCIT (caffeine citrate) Injection and Oral Solution. RLI. Apr. 2000. https://www.accessdata.fda.gov/drugsatfda_docs/label/2000/20793s1lbl.pdf [last accessed Jul. 22, 2019], 19 pages.

[No Author Listed], CVS Health Caffeine Tablets, 80 CT. CVS.com. https://www.cvs.com/shop/cvs-health-caffeine-tablets-80ct-prodid-984401?skuid=984401 [last accessed Jul. 22, 2019], 1 page.

[No Author Listed], FDA Approved Drug Products. U.S. Food and Drug Administration https://www.accessdata.fda.gov/scripts/cder/daf/index.cfm?event=overview.process&varApplNo=0 20793 [last accessed Jul. 22, 2019], 2 pages.

[No Author Listed], 5-hour ENERGY Shot Ingredients. Living Essentials Marketing, LLC. https://5hourenergy.com/facts/ingredients/ [last accessed Jul. 22, 2019], 3 pages.

[No Author Listed], Milk Chocolate Bars. Awake Energy USA. https://awakechocolate.com/products/awake-milk-chocolate-bars-12-pack [last accessed Jul. 22, 2019], 6 pages.

[No Author Listed], Red Bull Energy Drink Ingredients. Red Bull GmbH. https://energydrink-us.redbull.com/en/ingredients-red-bull [last accessed Jul. 22, 2019], 5 pages.

[No Author Listed], Vitamin Water-Energy Tropical Citrus. The Coca Cola Company. https://www.vitaminwater.com/products/energy/ [last accessed Jul. 22, 2019], 2 pages.

Ayala et al., Quantitative determination of caffeine and alcohol in energy drinks and the potential to produce positive transdermal alcohol concentrations in human subjects. J Anal Toxicol. Jan.-Feb. 2009;33(1):27-33.

Bechalany et al., Isotope Effects on the Lipophilicity of Deuterated Caffeines. Hely Chim Acta. May 3, 1989;72(3):472-476.

Benchekroun et al., Deuterium isotope effects on caffeine metabolism. Eur J Drug Metab Pharmacokinet. Apr.-Jun. 1997;22(2):127-33.

Hewitt, Using the 'deuterium switch' to understand how receptors work. Jun. 7, 2016. www.phys.org/news/2016-06-deuterium-receptors.html. [last accessed Jun. 26, 2019], 5 pages.

Nehlig, Interindividual Differences in Caffeine Metabolism and Factors Driving Caffeine Consumption. Pharmacol Rev. Apr. 2018;70(2):384-411. doi: 10.1124/pr.117.014407. Epub Mar. 7, 2018.

* cited by examiner

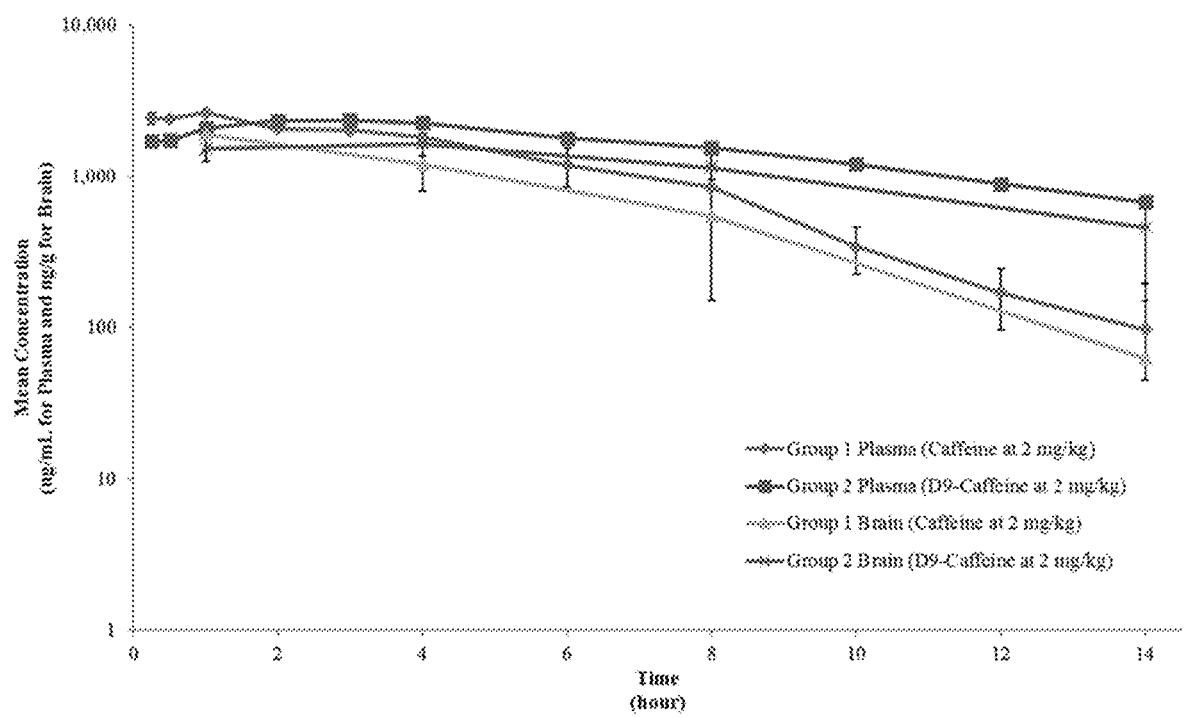

DEUTERATED CAFFEINE AND USES THEREOF

RELATED APPLICATIONS

This application claims priority under 35 U.S.C. § 119(e) to U.S. Provisional Application, U.S. Ser. No. 62/861,517, filed on Jun. 14, 2019, which is incorporated herein by reference.

BACKGROUND

Caffeine is a central nervous system (CNS) stimulant belonging to the methylxanthine chemical class. It is the world's most widely consumed psychoactive drug. Caffeine affects several biological processes. The most prominent is reversibly blocking the action of adenosine on the adenosine receptor, thus, preventing the onset of drowsiness and fatigue induced by adenosine. It is also known that caffeine stimulates portions of the autonomic nervous system. In addition to its anti-drowsiness effect, caffeine has also been shown to positively impact learning, memory, reaction time, wakefulness, concentration, and motor coordination. Caffeine is also useful in treating bronchopulmonary dysplasia in premature infants, improving weight gain during therapy, and reducing the incidence of cerebral palsy, in addition to reducing language and cognitive delays. Additionally, caffeine has demonstrated promising results in treating orthostatic hypotension, hypoxic-ischemic encephalopathy (HIE), and delaying the progression of Alzheimer's disease. Furthermore, caffeine citrate, marketed under the brand name, CAFCIT®, is approved by the FDA for the treatment of apnea of prematurity in neonates.

However, despite the positive attributes discussed above, caffeine suffers from some significant physical and psychological adverse effects that limit its use. Caffeine can increase blood pressure, affect gastrointestinal motility and gastric secretion, cause heart palpitations, cause and worsen anxiety and insomnia, and can be addictive. It is believed that some or all of the aforementioned adverse effects can be attributed to caffeine's pharmacokinetic and metabolic profile. Caffeine ingestion results in a high maximal plasma concentration (plasma $C_{max}$), a short time of maximal plasma concentration ($T_{max}$) after ingestion, short half-life ($t_{1/2}$), and rapid clearance, mainly by hepatic cytochrome P450 (CYP450) demethylation to afford paraxanthine, theobromine, and theophylline. In other words, ingestion of caffeine results in a large "spike" in caffeine plasma concentration (i.e., large $C_{max}$) shortly after caffeine ingestion (i.e., short $T_{max}$) followed by a "crash" in caffeine plasma concentration due to rapid metabolism and clearance. It is believed that the magnitude of this "spike" and the rapidity of this "crash" are at least partially responsible for the aforementioned adverse effects. Therefore, one approach to mitigate these adverse effects is to develop compounds and compositions that harness the positive attributes of caffeine without the negative effects, that is, with pharmacokinetic profiles exhibiting lower $C_{max}$ values, longer half-life, and/or longer $T_{max}$ values than caffeine.

SUMMARY OF THE INVENTION

The present invention relates to compositions (e.g., pharmaceutical compositions, nutraceutical compositions, foods, beverages, cosmetic compositions, diet supplements) comprising deuterated caffeine. In certain embodiments, the composition is suitable for oral administration. In certain embodiments, the composition is suitable for intravenous (IV) administration. In certain embodiments, the composition is suitable for topical administration. In certain embodiments, the composition is suitable for delivery to the lungs. In certain embodiments, the composition is administered using an electronic cigarette or other vaping device, a nebulizer, a pressurized metered dose inhaler (pMDI), or a dry powder inhaler (DPI). In certain embodiments, the composition is a solid dose composition (e.g., tablet, capsule, granule, powder, sachet, or chewable), solution, gel, suspension, emulsion, shampoo, conditioner, cream, foam, gel, lotion, ointment, transdermal patch, tincture, or paste. Also provided herein are kits containing the compositions and instructions for use. Further provided herein are use of the compositions described herein for treating a disease, preventing a disease, treating a condition, and/or preventing a condition.

The compositions described herein comprise deuterated caffeine (i.e., wherein at least one of the hydrogen atoms of caffeine is replaced with deuterium). In certain embodiments, the composition comprises a compound of Formula (I):

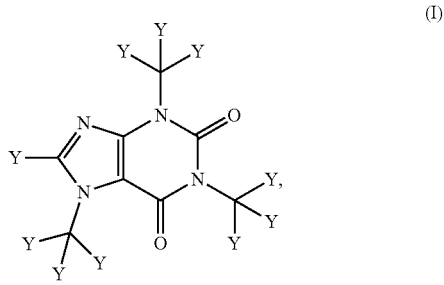

or a pharmaceutically or nutraceutically acceptable salt, hydrate, or solvate thereof;

wherein each Y is independently hydrogen or deuterium; and at least one Y is deuterium.

In certain embodiments, the composition comprises about 1 mg to about 10,000 mg of a compound of Formula (I), or a pharmaceutically or nutraceutically acceptable salt, hydrate, or solvate thereof. In certain embodiments, the percentage of the amount of the compound of Formula (I), or a pharmaceutically or nutraceutically acceptable salt, hydrate solvate, or prodrug thereof, relative to the total amount of caffeine present in the composition ranges from about 5% to about 99%. In another aspect, the composition is an oral composition. In another aspect, the composition is a solid dose composition (e.g., tablet, capsule, granule, powder, sachet, or chewable). In another aspect, the composition is suitable for intravenous (IV) administration. In another aspect, the composition is a topical composition. In another aspect, the composition is a shampoo, conditioner, cream, foam, gel, lotion, ointment, transdermal patch, tincture, or paste. In another aspect, the composition is suitable for inhalation. In another aspect, the composition is administered using an electronic cigarette or other vaping device, a nebulizer, a pressurized metered dose inhaler (pMDI), or a dry powder inhaler (DPI). In another aspect, the composition is suitable for buccal administration.

The disclosure further provides a food product comprising deuterated caffeine (e.g., a compound of Formula (I)).

The disclosure further provides a beverage (e.g., energy drink, vitamin water) comprising deuterated caffeine (e.g., a compound of Formula (I)).

The disclosure further provides kits comprising one or more compositions described herein and instructions for using the composition(s).

The disclosure further provides methods of delivering the compound of Formula (I), or a pharmaceutically or nutraceutically acceptable salt, hydrate solvate, composition, or prodrug thereof, to a subject in need thereof comprising administering to the subject in need thereof the compound of Formula (I), or a pharmaceutically or nutraceutically acceptable salt, hydrate solvate, composition, or prodrug thereof.

The disclosure further provides methods of treating a disease in a subject in need thereof comprising administering to the subject in need thereof the compound of Formula (I), or a pharmaceutically or nutraceutically acceptable salt, hydrate, solvate, composition, or prodrug thereof.

The disclosure further provides methods of preventing a disease in a subject in need thereof comprising administering to the subject in need thereof the compound of Formula (I), or a pharmaceutically or nutraceutically acceptable salt, hydrate, solvate, composition, or prodrug thereof.

The disclosure further provides methods of treating a condition in a subject in need thereof comprising administering to the subject in need thereof the compound of Formula (I), or a pharmaceutically or nutraceutically acceptable salt, hydrate, solvate, composition, or prodrug thereof.

The disclosure further provides methods of preventing a condition in a subject in need thereof comprising administering to the subject in need thereof the compound of Formula (I), or a pharmaceutically or nutraceutically acceptable salt, hydrate, solvate, composition, or prodrug thereof.

In certain embodiments, the subject is a human. In certain embodiments, the subject is an animal.

In another aspect, the side effects experienced after administration of a compound of Formula (I), or a pharmaceutically or nutraceutically acceptable salt, hydrate, solvate, composition, or prodrug thereof, are reduced relative to the administration of caffeine at an equivalent dose. In another aspect, the side effect is anxiety, insomnia, gastrointestinal issues (e.g., loose stools, diarrhea, stomach ulcers, gastroesophageal reflux, etc.), rhabdomyolysis, addiction, hypertension, rapid heart rate, atrial fibrillation, fatigue, irritability, nervousness, restlessness, nausea, or muscle tremors.

In another aspect, the administration of a compound of Formula (I), or a pharmaceutically or nutraceutically acceptable salt, hydrate, solvate, composition, or prodrug thereof, results in an increased duration of action, reduction in frequency of administration, increase in patient compliance and/or ease of use relative to the administration of caffeine at an equivalent dose.

In another aspect, the administration of a compound of Formula (I), or a pharmaceutically or nutraceutically acceptable salt, hydrate, solvate, composition, or prodrug thereof, results in a similar relative magnitude of exposure in plasma and the central nervous system as compared to the administration of non-isotopically enriched caffeine at an equivalent dose.

The details of one or more embodiments of the present disclosure are set forth herein. Other features, objects, and advantages of the present disclosure will be apparent from the Detailed Description, Examples, and Claims.

BRIEF DESCRIPTION OF THE DRAWINGS

The present invention is further described below with reference to the following non-limiting examples and with reference to the following figures, in which:

FIG. 1. depicts the mean (+SD) concentrations of caffeine and D9-caffeine (Compound 14) in plasma and brain over 14 hours following an oral (gavage) dose of caffeine or D9-caffeine (Compound 14) to fasted male Sprague Dawley rats at a dose of 2 mg/kg.

DEFINITIONS

Before further description of the present invention, and in order that the invention may be more readily understood, certain terms are first defined and collected here for convenience.

The terms "composition" and "formulation" are used interchangeably.

The term "total amount of caffeine" refers to the combined total amount of deuterated caffeine and non-isotopically enriched caffeine.

The amount of an active agent (e.g., deuterated caffeine) or combination of active agents thereof included in a provided composition, food product, beverage, or nutritional supplement described herein will depend on the target population. In some embodiments, a provided composition, food product, beverage, or nutritional supplement contains an effective amount of an active agent (e.g., deuterated caffeine). The term "effective amount," as used herein, refers to a sufficient amount of the active agent (e.g., deuterated caffeine) to produce a desired outcome. The exact amount required will vary from subject to subject, depending on the species, age, general condition of the subject, and the indication. The term "therapeutically effective amount" as used herein refers to a sufficient amount of a pharmaceutical or nutraceutical agent (e.g., deuterated caffeine) to achieve the intended purpose, such as, for example, to cause a reduction of symptoms of a condition or disease. A "prophylactically effective amount" refers to a sufficient amount of a pharmaceutical or nutraceutical agent (e.g., deuterated caffeine) to achieve the intended purpose, such as prevention of a condition or disease, one or more symptoms associated with the condition or disease, and/or the recurrence thereof. In certain embodiments, an effective amount of a composition, food product, beverage, or nutritional supplement is the effective amount of the active agent (e.g., deuterated caffeine) included in the composition, food product, beverage, or nutritional supplement.

The term "energy beverage" refers to a type of drink containing sugar and stimulant compounds (e.g., caffeine), which provides mental and physical stimulation.

The term "vitamin water" refers to water with added natural or artificial flavors, sugar, sweeteners, vitamins, and minerals.

DETAILED DESCRIPTION OF CERTAIN EMBODIMENTS OF THE INVENTION

The present invention relates to compositions comprising deuterated caffeine (e.g., a compound of Formula (I)). Also provided herein are kits containing the compositions and instructions for use. Further provided herein are uses of any of the compounds or compositions described herein for treating a disease, preventing a disease, treating a condition, preventing a condition, and/or causing an effect.

Compositions, Kits, and Administration

In one aspect, the invention provides a pharmaceutical composition comprising a compound of Formula (I):

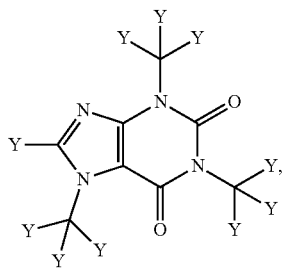

or a pharmaceutically acceptable salt, hydrate, or solvate thereof;

wherein each Y is independently hydrogen or deuterium; and at least one Y is deuterium.

In another aspect, the invention provides a nutraceutical composition comprising a compound of Formula (I):

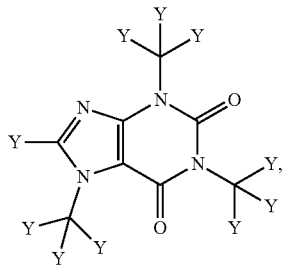

or a nutraceutically acceptable salt, hydrate, solvate, or prodrug thereof;

wherein each Y is independently hydrogen or deuterium; and at least one Y is deuterium.

In another aspect, the invention provides a food product comprising a compound of Formula (I):

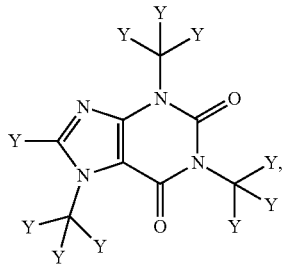

or a nutraceutically acceptable salt, hydrate, solvate, or prodrug thereof;

wherein each Y is independently hydrogen or deuterium; and at least one Y is deuterium.

In another aspect, the invention provides a beverage comprising a compound of Formula (I):

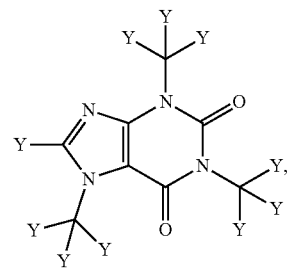

or a nutraceutically acceptable salt, hydrate, solvate, or prodrug thereof;

wherein each Y is independently hydrogen or deuterium; and at least one Y is deuterium.

In another aspect, the invention provides a nutritional supplement comprising a compound of Formula (I):

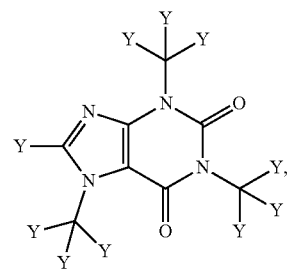

or a nutraceutically acceptable salt, hydrate, solvate, or prodrug thereof;

wherein each Y is independently hydrogen or deuterium; and at least one Y is deuterium.

In any of the pharmaceutical compositions, nutraceutical compositions, food products, beverages, or nutritional supplements described herein, at least two to eight instances of Y of the compound of Formula (I) are deuterium. In any of the pharmaceutical compositions, nutraceutical compositions, food products, beverages, or nutritional supplements described herein, at least two instances of Y of the compound of Formula (I) are deuterium. In any of the pharmaceutical compositions, nutraceutical compositions, food products, beverages, or nutritional supplements described herein, at least three instances of Y of the compound of Formula (I) are deuterium In any of the pharmaceutical compositions, nutraceutical compositions, food products, beverages, or nutritional supplements described herein, at least four instances of Y of the compound of Formula (I) are deuterium. In any of the pharmaceutical compositions, nutraceutical compositions, food products, beverages, or nutritional supplements described herein, at least five instances of Y of the compound of Formula (I) are deuterium. In any of the pharmaceutical compositions, nutraceutical compositions, food products, beverages, or nutritional supplements described herein, at least six instances of Y of the compound of Formula (I) are deuterium. In any of the pharmaceutical compositions, nutraceutical compositions, food products, beverages, or nutritional supplements described herein, at least seven instances of Y of the compound of Formula (I) are deuterium. In any of the pharmaceutical compositions, nutraceutical compositions, food products, beverages, or nutritional supplements described herein, at least eight instances of Y of the compound of Formula (I) are deuterium. In any of the pharmaceutical compositions, nutraceutical compositions, food products, beverages, or nutritional supplements described herein, nine instances of Y of the compound of Formula (I) are deuterium In any of the pharmaceutical compositions, nutraceutical compositions, food products, beverages, or nutritional supplements described herein, each Y of the compound of Formula (I) is a deuterium.

In another aspect, the compound of Formula (I), or a pharmaceutically or nutraceutically acceptable salt, hydrate, or solvate thereof, is of Formula (I-A), (I-B), or (I-C):

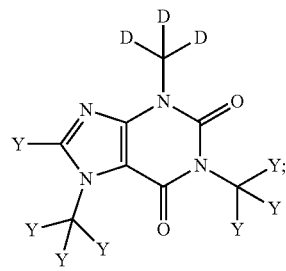
(I-A)

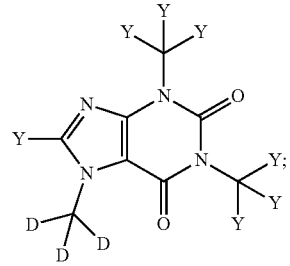
(I-B)

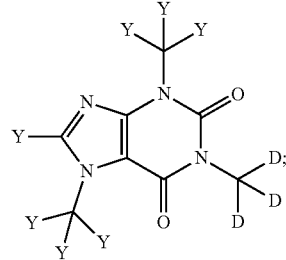
(I-C)

or a pharmaceutically or nutraceutically acceptable salt, hydrate, or solvate thereof.

In another aspect, the compound of Formula (I), or a pharmaceutically or nutraceutically acceptable salt, hydrate, or solvate, thereof, is of Formula (I-D), (I-E), or (I-F):

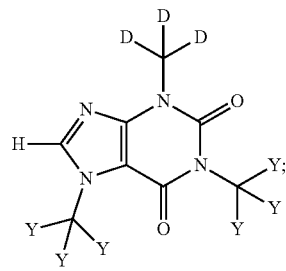
(I-D)

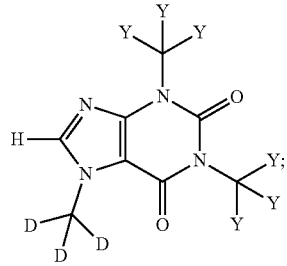
(I-E)

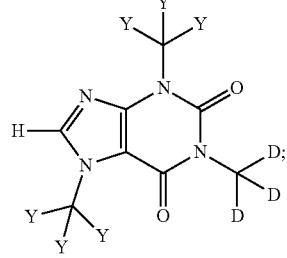
(I-F)

or a pharmaceutically or nutraceutically acceptable salt, hydrate, or solvate thereof.

In another aspect, the compound of Formula (I), or a pharmaceutically or nutraceutically acceptable salt, hydrate, or solvate, thereof, is of Formula (I-G), (I-H), (I-I), (I-J), (I-K), or (I-L):

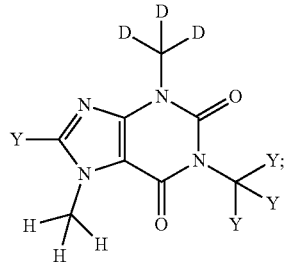
(I-G)

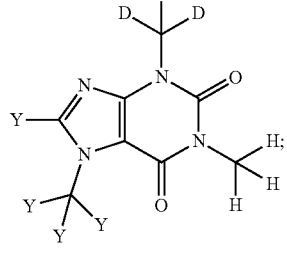
(I-H)

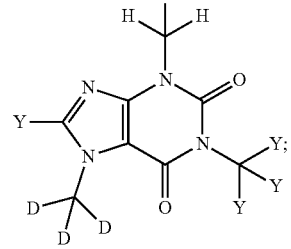
(I-I)

(I-J)
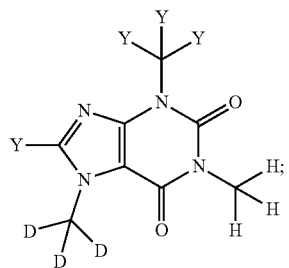

(I-K)
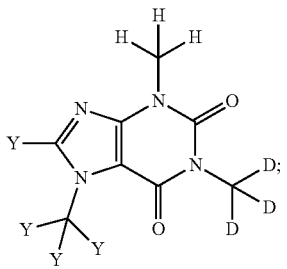

(I-L)
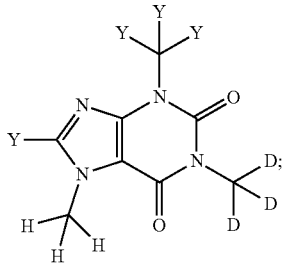

or a pharmaceutically or nutraceutically acceptable salt, hydrate, or solvate thereof.

In another aspect, the compound of Formula (I), or a pharmaceutically or nutraceutically acceptable salt, hydrate, or solvate thereof, is of Formula (I-M), (I-N), (I-O), (I-P), (I-Q), or (I-R):

(I-M)
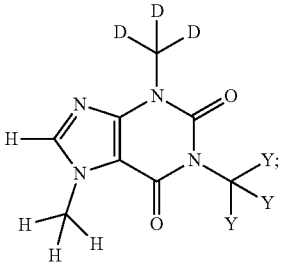

(I-N)
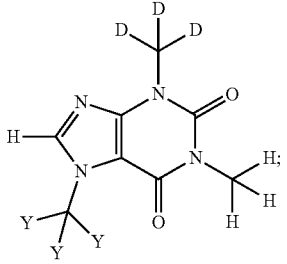

(I-O)
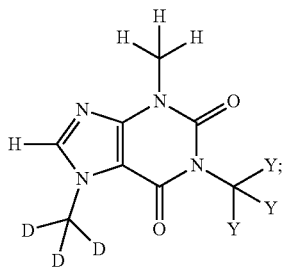

(I-P)
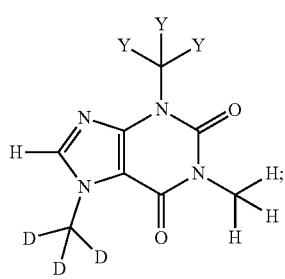

(I-Q)
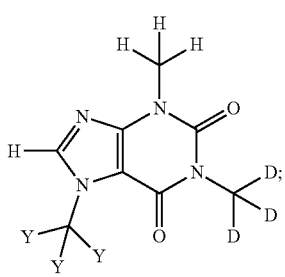

(I-R)
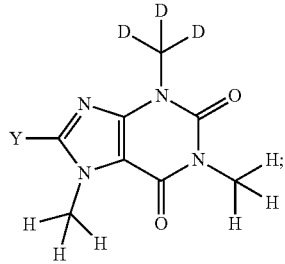

or a pharmaceutically or nutraceutically acceptable salt, hydrate, or solvate thereof.

In another aspect, the compound of Formula (I), or a pharmaceutically or nutraceutically acceptable salt, hydrate, or solvate thereof, is of Formula (I-S), (I-T), or (I-U):

(I-S)

-continued

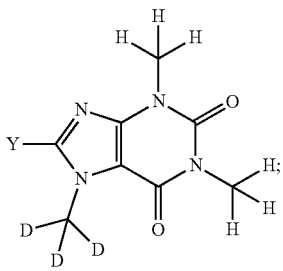
(I-T)

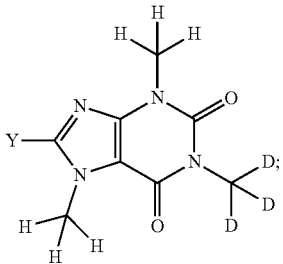
(I-U)

or a pharmaceutically or nutraceutically acceptable salt, hydrate, or solvate thereof.

In another aspect, the compound of Formula (I), or a pharmaceutically or nutraceutically acceptable salt, hydrate, or solvate thereof, is of Formula (II-A), (II-B), or (II-C):

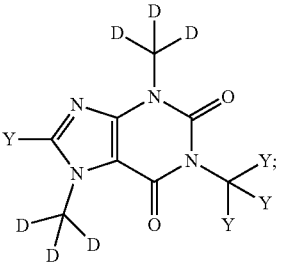
(II-A)

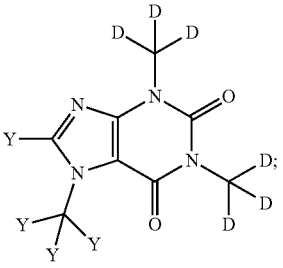
(II-B)

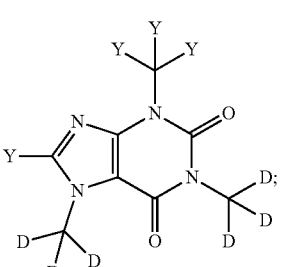
(II-C)

or a pharmaceutically or nutraceutically acceptable salt, hydrate, or solvate thereof.

In another aspect, the compound of Formula (I), or a pharmaceutically or nutraceutically acceptable salt, hydrate, or solvate thereof, is of Formula (II-D), (II-E), or (II-F):

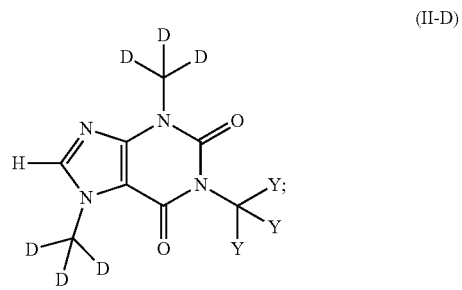
(II-D)

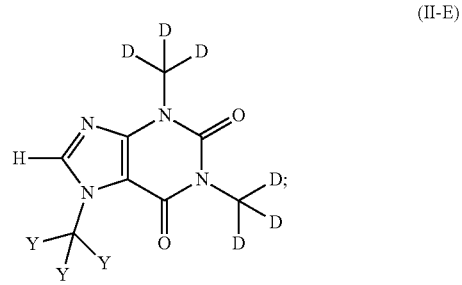
(II-E)

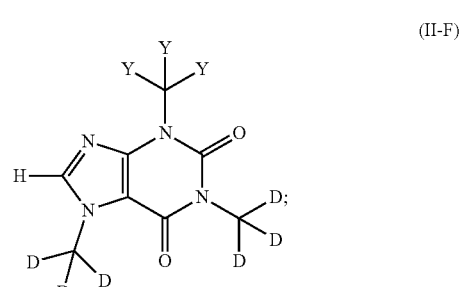
(II-F)

or a pharmaceutically or nutraceutically acceptable salt, hydrate, or solvate thereof.

In another aspect, the compound of Formula (I), or a pharmaceutically or nutraceutically acceptable salt, hydrate, or solvate thereof, is of Formula (II-G), (II-H), or (II-I):

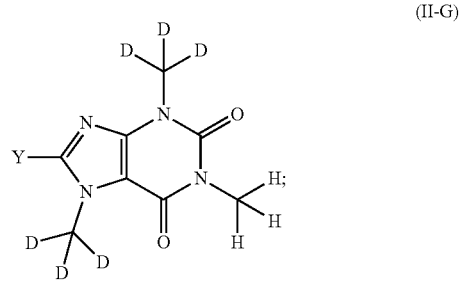
(II-G)

-continued
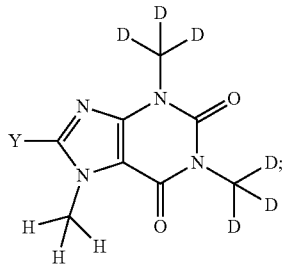
(II-H)
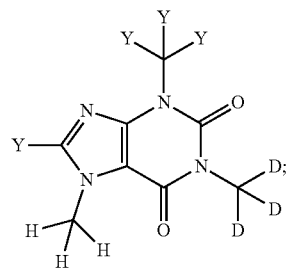
(II-I)
or a pharmaceutically or nutraceutically acceptable salt, hydrate, or solvate thereof.
In another aspect, the compound of Formula (I), or a pharmaceutically or nutraceutically acceptable salt, hydrate, or solvate thereof, is selected from the group consisting of:
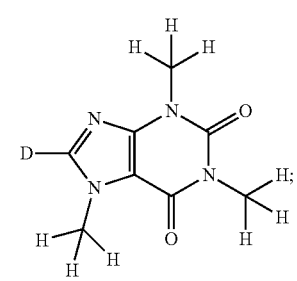
(1)
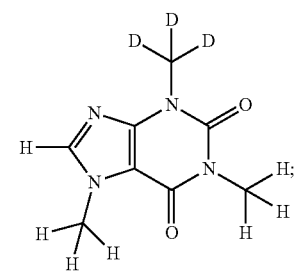
(2)
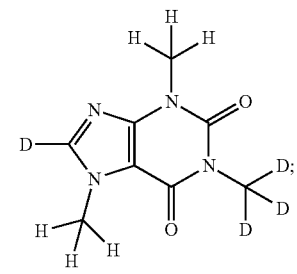
(3)
-continued
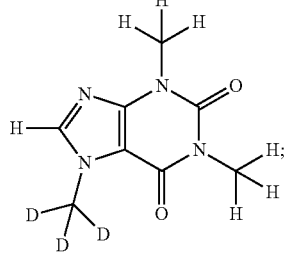
(4)
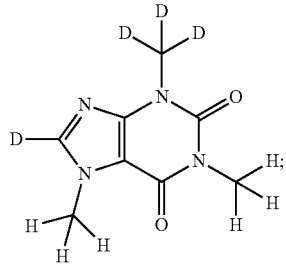
(5)
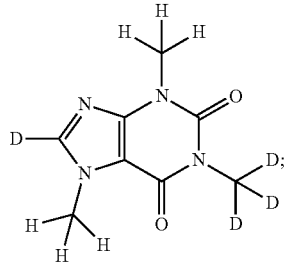
(6)
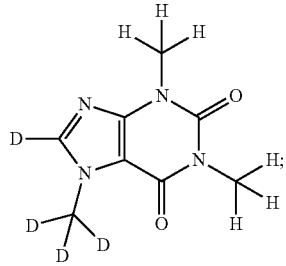
(7)
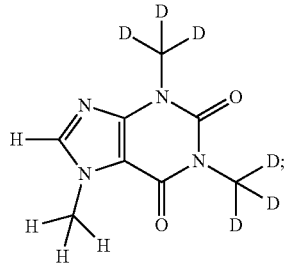
(8)
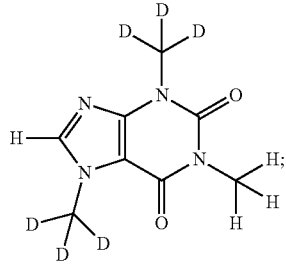
(9)

-continued

(10)
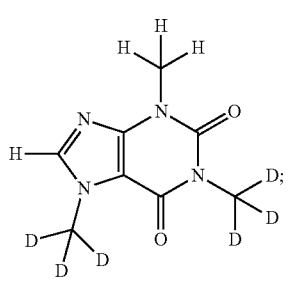

(11)
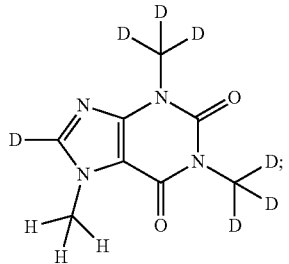

(12)
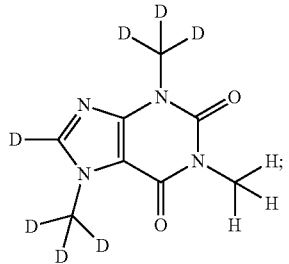

(13)
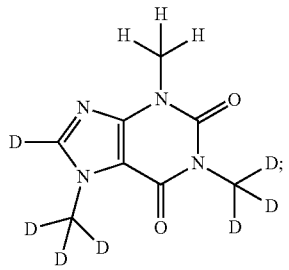

(14)
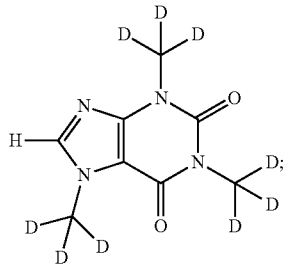

(15)
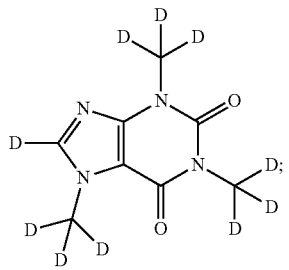

and pharmaceutically or nutraceutically acceptable salts, hydrates, or solvates thereof.

Another aspect is provided a salt of a compound of Formula (I). In another aspect, the salt is an HCl, sulfate, acetate, phosphate, diphosphate, maleate, citrate, mesylate, nitrate, tartrate, or gluconate salt. In another aspect, the salt is a citrate salt.

In another aspect, the compound of Formula (I), or a pharmaceutically or nutraceutically acceptable salt, hydrate, or solvate thereof, is selected from the group consisting of:

(16)

(17)

(18)

(19)

-continued
(20)
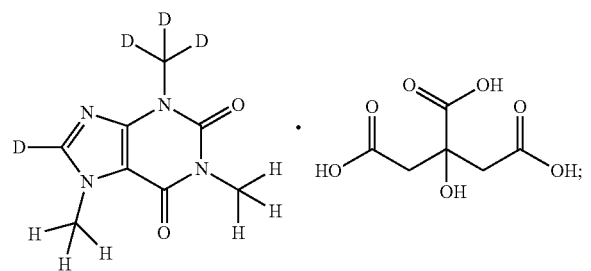
(21)
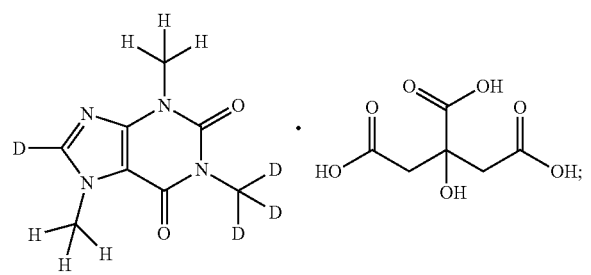
(22)
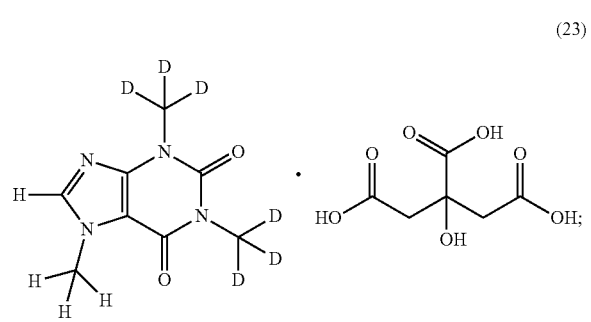 [SMILES: [2H]c1nc2c(c(=O)n(C([2H])([2H])[2H])c(=O)n2C)n1C ; O=C(O)CC(O)(CC(=O)O)C(=O)O]
(23)
(24)
-continued
(25)
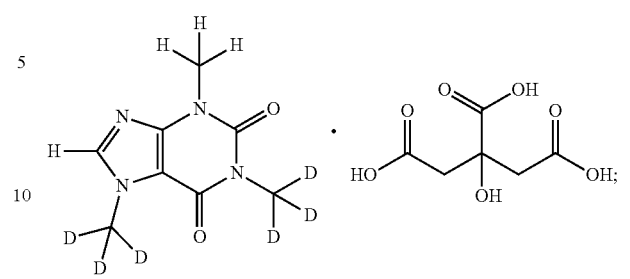
(26)
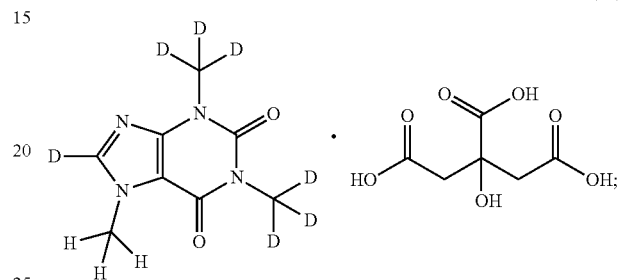
(27)
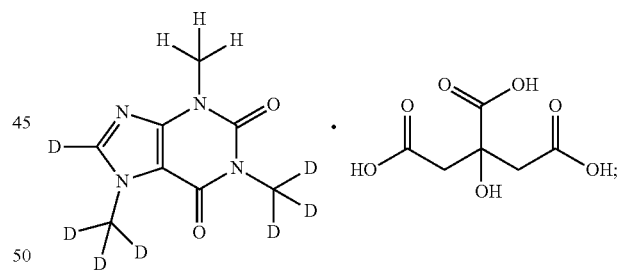
(28)
(29)
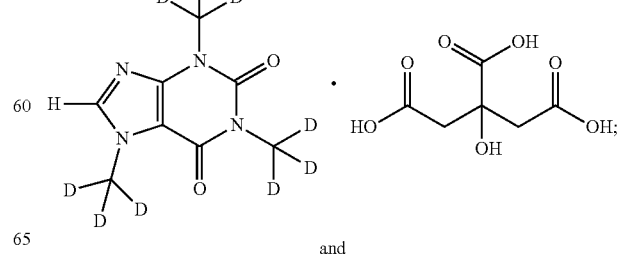
and -continued

(30)
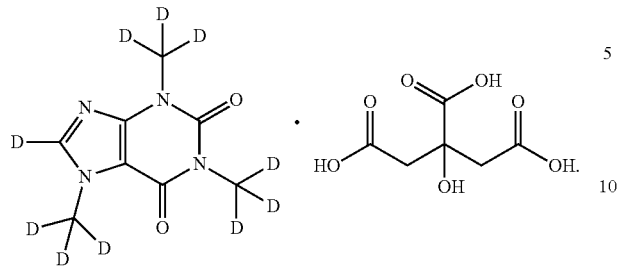

In another aspect, the compound of Formula (I), or a pharmaceutically or nutraceutically acceptable salt, hydrate, or solvate thereof, is (1)
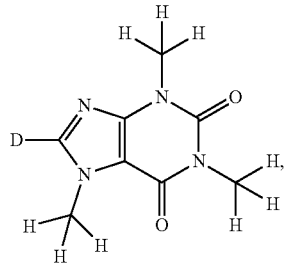

or a pharmaceutically or nutraceutically acceptable salt, hydrate, or solvate thereof. In another aspect, the compound of Formula (I), or a pharmaceutically or nutraceutically acceptable salt, hydrate, or solvate thereof, is (2)
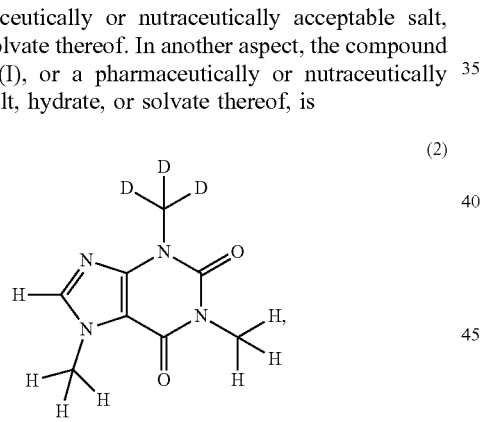

or a pharmaceutically or nutraceutically acceptable salt, hydrate, or solvate thereof. In another aspect, the compound of Formula (I), or a pharmaceutically or nutraceutically acceptable salt, hydrate, or solvate thereof, is (3)
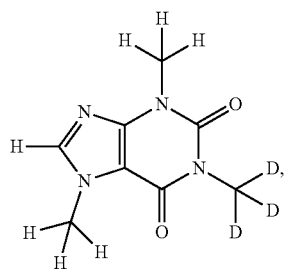

or a pharmaceutically or nutraceutically acceptable salt, hydrate, or solvate thereof. In another aspect, the compound of Formula (I), or a pharmaceutically or nutraceutically acceptable salt, hydrate, or solvate thereof, is (4)
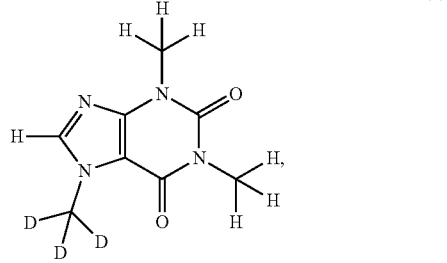

or a pharmaceutically or nutraceutically acceptable salt, hydrate, or solvate thereof. In another aspect, the compound of Formula (I), or a pharmaceutically or nutraceutically acceptable salt, hydrate, or solvate thereof, is (5)
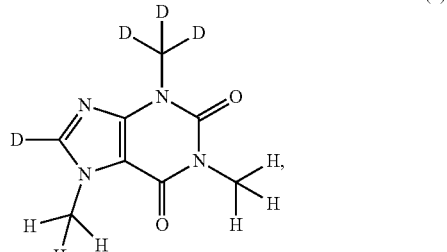

or a pharmaceutically or nutraceutically acceptable salt, hydrate, or solvate thereof. In another aspect, the compound of Formula (I), or a pharmaceutically or nutraceutically acceptable salt, hydrate, or solvate thereof, is (6)
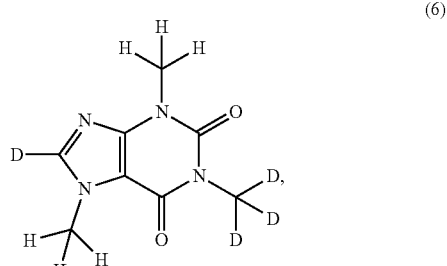

or a pharmaceutically or nutraceutically acceptable salt, hydrate, or solvate thereof. In another aspect, the compound of Formula (I), or a pharmaceutically or nutraceutically acceptable salt, hydrate, or solvate thereof, is

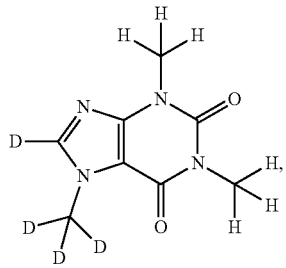

(7)

or a pharmaceutically or nutraceutically acceptable salt, hydrate, or solvate thereof. In another aspect, the compound of Formula (I), or a pharmaceutically or nutraceutically acceptable salt, hydrate, or solvate thereof, is (8)

or a pharmaceutically or nutraceutically acceptable salt, hydrate, or solvate thereof. In another aspect, the compound of Formula (I), or a pharmaceutically or nutraceutically acceptable salt, hydrate, or solvate thereof, is (9)

or a pharmaceutically or nutraceutically acceptable salt, hydrate, or solvate thereof. In another aspect, the compound of Formula (I), or a pharmaceutically or nutraceutically acceptable salt, hydrate, or solvate thereof, is (10)

or a pharmaceutically or nutraceutically acceptable salt, hydrate, or solvate thereof. In another aspect, the compound of Formula (I), or a pharmaceutically or nutraceutically acceptable salt, hydrate, or solvate thereof, is

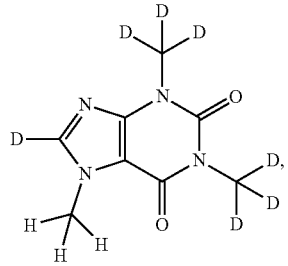

(11)

or a pharmaceutically or nutraceutically acceptable salt, hydrate, or solvate thereof. In another aspect, the compound of Formula (I), or a pharmaceutically or nutraceutically acceptable salt, hydrate, or solvate thereof, is (12)

or a pharmaceutically or nutraceutically acceptable salt, hydrate, or solvate thereof. In another aspect, the compound of Formula (I), or a pharmaceutically or nutraceutically acceptable salt, hydrate, or solvate thereof, is

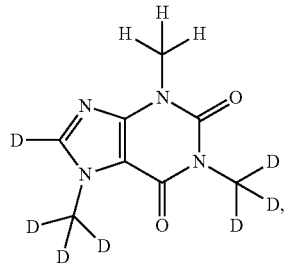

(13)

or a pharmaceutically or nutraceutically acceptable salt, hydrate, or solvate thereof. In another aspect, the compound of Formula (I), or a pharmaceutically or nutraceutically acceptable salt, hydrate, or solvate thereof, is (14)

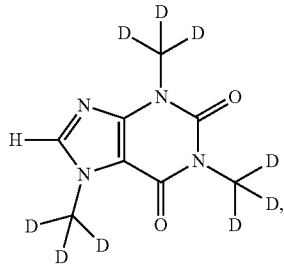

or a pharmaceutically or nutraceutically acceptable salt, hydrate, or solvate thereof. In another aspect, the compound of Formula (I), or a pharmaceutically or nutraceutically acceptable salt, hydrate, or solvate thereof, is (15)

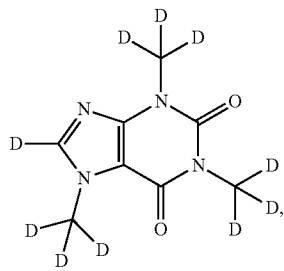

or a pharmaceutically or nutraceutically acceptable salt, hydrate, or solvate thereof. In another aspect, the compound of Formula (I), or a pharmaceutically or nutraceutically acceptable salt, hydrate, or solvate thereof, is (16)

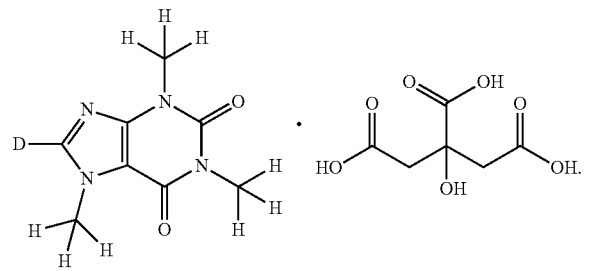

In another aspect, the compound of Formula (I), or a pharmaceutically or nutraceutically acceptable salt, hydrate, or solvate thereof, is (17)

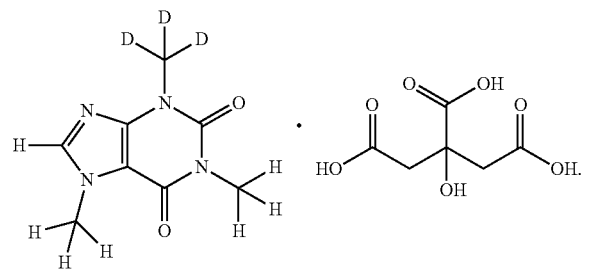

In another aspect, the compound of Formula (I), or a pharmaceutically or nutraceutically acceptable salt, hydrate, or solvate thereof, is (18)

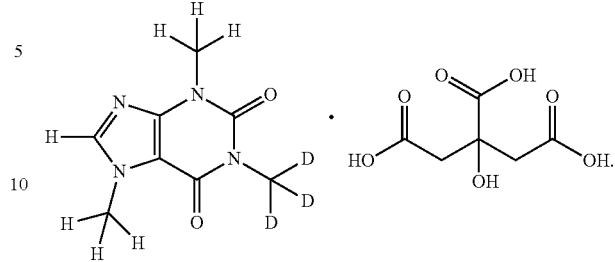

In another aspect, the compound of Formula (I), or a pharmaceutically or nutraceutically acceptable salt, hydrate, or solvate thereof, is (19)

In another aspect, the compound of Formula (I), or a pharmaceutically or nutraceutically acceptable salt, hydrate, or solvate thereof, is (20)

In another aspect, the compound of Formula (I), or a pharmaceutically or nutraceutically acceptable salt, hydrate, or solvate thereof, is (21)

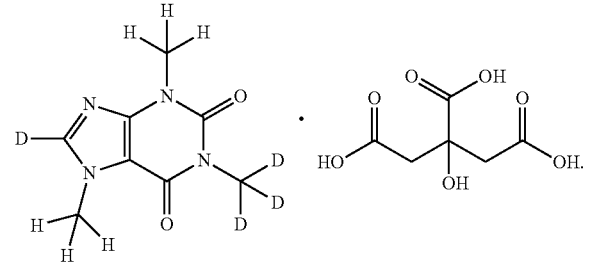

In another aspect, the compound of Formula (I), or a pharmaceutically or nutraceutically acceptable salt, hydrate, or solvate thereof, is (22)

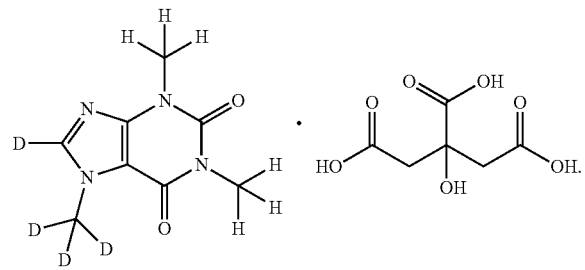

In another aspect, the compound of Formula (I), or a pharmaceutically or nutraceutically acceptable salt, hydrate, or solvate thereof, is (23)

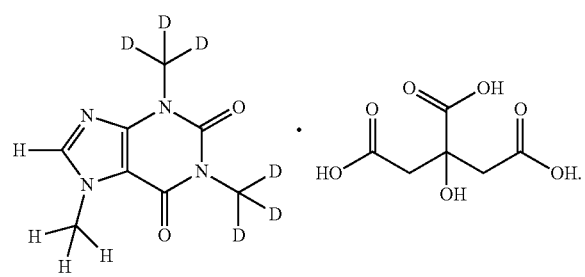

In another aspect, the compound of Formula (I), or a pharmaceutically or nutraceutically acceptable salt, hydrate, or solvate thereof, is (24)

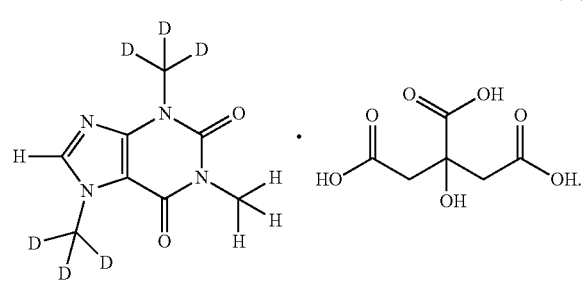

In another aspect, the compound of Formula (I), or a pharmaceutically or nutraceutically acceptable salt, hydrate, or solvate thereof, is (25)

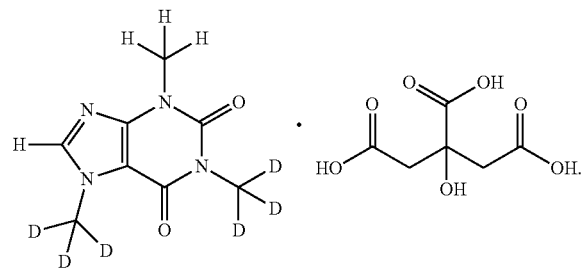

In another aspect, the compound of Formula (I), or a pharmaceutically or nutraceutically acceptable salt, hydrate, or solvate thereof, is (26)

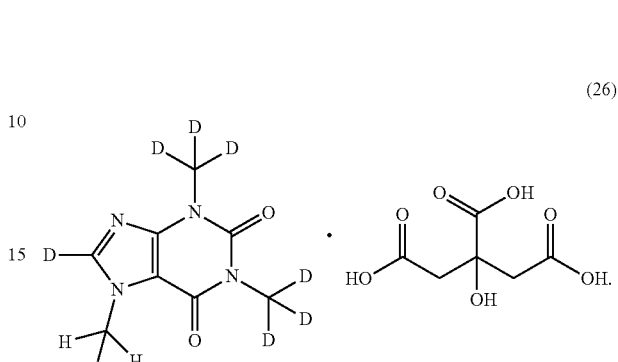

In another aspect, the compound of Formula (I), or a pharmaceutically or nutraceutically acceptable salt, hydrate, or solvate thereof, is (27)

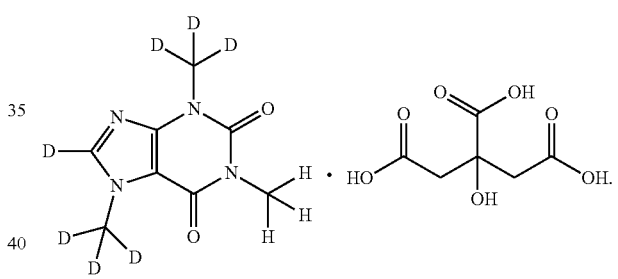

In another aspect, the compound of Formula (I), or a pharmaceutically or nutraceutically acceptable salt, hydrate, or solvate thereof, is (28)

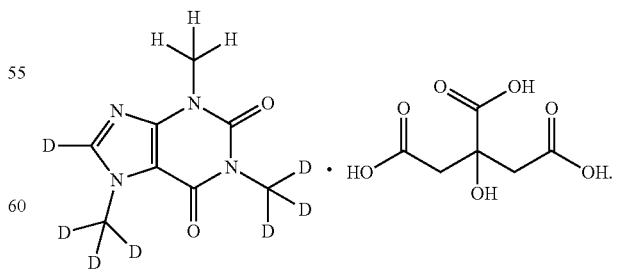

In another aspect, the compound of Formula (I), or a pharmaceutically or nutraceutically acceptable salt, hydrate, or solvate thereof, is (29)

[Chemical structure: caffeine with CD3 groups on N1, N3, N7 (methyls as CD3) and H on C8, with citric acid]

In another aspect, the compound of Formula (I), or a pharmaceutically or nutraceutically acceptable salt, hydrate, or solvate thereof, is (30)

[Chemical structure: caffeine with CD3 groups on N1, N3, N7 and D on C8, with citric acid]

In another aspect, the compound of Formula (I), or a pharmaceutically or nutraceutically acceptable salt, hydrate, or solvate thereof, has an isotopic purity of at least 50.0%, 60.0%, 70.0%, 75.0%, 80.0%, 85.0%, 90.0%, 95.0%, 97.0%, 98.0%, 99.0%, 99.5%, 99.7%, 99.8%, or 99.9%. In any of the pharmaceutical compositions, nutraceutical compositions, food products, beverages, or nutritional supplements described herein, the compound of Formula (I), or a pharmaceutically or nutraceutically acceptable salt, hydrate, or solvate thereof, has an isotopic purity of at least 50.0%. In another aspect, the compound of Formula (I), or a pharmaceutically or nutraceutically acceptable salt, hydrate, or solvate thereof, has an isotopic purity of at least 60.0%. In another aspect, the compound of Formula (I), or a pharmaceutically or nutraceutically acceptable salt, hydrate, or solvate thereof, has an isotopic purity of at least 70.0%. In another aspect, the compound of Formula (I), or a pharmaceutically or nutraceutically acceptable salt, hydrate, or solvate thereof, has an isotopic purity of at least 75.0%. In another aspect, the compound of Formula (I), or a pharmaceutically or nutraceutically acceptable salt, hydrate, or solvate thereof, has an isotopic purity of at least 80.0%. In another aspect, the compound of Formula (I), or a pharmaceutically or nutraceutically acceptable salt, hydrate, or solvate thereof, has an isotopic purity of at least 85.0%. In another aspect, the compound of Formula (I), or a pharmaceutically or nutraceutically acceptable salt, hydrate, or solvate thereof, has an isotopic purity of at least 90.0%. In another aspect, the compound of Formula (I), or a pharmaceutically or nutraceutically acceptable salt, hydrate, or solvate thereof, has an isotopic purity of at least 95.0%. In another aspect, the compound of Formula (I), or a pharmaceutically or nutraceutically acceptable salt, hydrate, or solvate thereof, has an isotopic purity of at least 97.0%. In another aspect, the compound of Formula (I), or a pharmaceutically or nutraceutically acceptable salt, hydrate, or solvate thereof, has an isotopic purity of at least 98.0%. In another aspect, the compound of Formula (I), or a pharmaceutically or nutraceutically acceptable salt, hydrate, or solvate thereof, has an isotopic purity of at least 99.0%. In another aspect, the compound of Formula (I), or a pharmaceutically or nutraceutically acceptable salt, hydrate, or solvate thereof, has an isotopic purity of at least 99.5%. In another aspect, the compound of Formula (I), or a pharmaceutically or nutraceutically acceptable salt, hydrate, or solvate thereof, has an isotopic purity of at least 99.7%. In another aspect, the compound of Formula (I), or a pharmaceutically or nutraceutically acceptable salt, hydrate, or solvate thereof, has an isotopic purity of at least 99.9%. In another aspect, the compound of Formula (I), or a pharmaceutically or nutraceutically acceptable salt, hydrate, or solvate thereof, is suitable for administration to a human or animal. In another aspect, the compound of Formula (I), or a pharmaceutically or nutraceutically acceptable salt, hydrate, or solvate thereof, is produced and tested in compliance with the Good Manufacturing Practice (GMP) requirements.

In another aspect, any of the pharmaceutical compositions, nutraceutical compositions, food products, beverages, or nutritional supplements described herein comprises about 1 mg to about 10,000 mg of the compound of Formula (I), or a pharmaceutically or nutraceutically acceptable salt, hydrate, or solvate thereof. In another aspect, any of the pharmaceutical compositions, nutraceutical compositions, food products, beverages, or nutritional supplements described herein comprises about 1 mg to about 5,000 mg of the compound of Formula (I), or a pharmaceutically or nutraceutically acceptable salt, hydrate, or solvate thereof. In another aspect, any of the pharmaceutical compositions, nutraceutical compositions, food products, beverages, or nutritional supplements described herein comprises about 1 mg to about 1000 mg of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 1 mg to about 800 mg of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 1 mg to about 600 mg of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 1 mg to about 400 mg of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 1 mg to about 300 mg of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 1 mg to about 250 mg of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 1 mg to about 200 mg of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 1 mg to about 125 mg of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 5 mg to about 75 mg of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 10 mg to about 200 mg of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 10 mg to about 150 mg of the compound of Formula (I), or a pharmaceutically or nutraceutically acceptable salt, hydrate, or solvate thereof. In another aspect the pharmaceutical composition, nutraceutical composition, food product, beverage, or nutritional supplement comprises about 10 mg to about 100 mg of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 10 mg to about 75 mg of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 10 mg to about 50 mg of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 20 mg to about 200 mg of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 20 mg to about 150 mg of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 20 mg to about 100 mg of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 20 mg to about 75 mg of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 20 mg to about 50 mg of the compound of Formula (I), or a pharmaceutically or nutraceutically acceptable salt, hydrate, or solvate thereof.

In another aspect, any of the pharmaceutical compositions, nutraceutical compositions, food products, beverages, or nutritional supplements described herein comprises about 1 mg/ml to about 100 mg/ml of the compound of Formula (I), or a pharmaceutically or nutraceutically acceptable salt, hydrate, or solvate thereof. In another aspect the pharmaceutical composition, nutraceutical composition, food product, beverage, or nutritional supplement comprises about 1 mg/ml to about 75 mg/ml of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 1 mg/ml to about 50 mg/ml of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 1 mg/ml to about 25 mg/ml of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 2 mg/ml to about 100 mg/ml of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 2 mg/ml to about 75 mg/ml of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 2 mg/ml to about 50 mg/ml of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 2 mg/ml to about 25 mg/ml of the compound of Formula (I), or a pharmaceutically or nutraceutically acceptable salt, hydrate, or solvate thereof. In another aspect the pharmaceutical composition, nutraceutical composition, food product, beverage, or nutritional supplement comprises about 2 mg/ml to about 15 mg/ml of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 5 mg/ml to about 100 mg/ml of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 5 mg/ml to about 75 mg/ml of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 5 mg/ml to about 50 mg/ml of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 5 mg/ml to about 25 mg/ml of the compound of Formula (I), or a pharmaceutically or nutraceutically acceptable salt, hydrate, or solvate thereof. In another aspect, the pharmaceutical composition, nutraceutical composition, food product, beverage, or nutritional supplement comprises about 5 mg/ml to about 15 mg/ml of the compound of Formula (I), or a pharmaceutically or nutraceutically acceptable salt, hydrate, or solvate thereof. In another aspect, the pharmaceutical or nutraceutical composition may comprise about 10 mg/ml to about 100 mg/ml of the compound of Formula (I), or a pharmaceutically or nutraceutically acceptable salt, hydrate, or solvate thereof. In another aspect, the pharmaceutical or nutraceutical composition may comprise about 10 mg/ml to about 75 mg/ml of the compound of Formula (I), or a pharmaceutically or nutraceutically acceptable salt, hydrate, or solvate thereof. In another aspect, the pharmaceutical or nutraceutical composition may comprise about 10 mg/ml to about 50 mg/ml of the compound of Formula (I), or a pharmaceutically or nutraceutically acceptable salt, hydrate, or solvate thereof. In another aspect, the pharmaceutical or nutraceutical composition may comprise about 10 mg/ml to about 25 mg/ml of the compound of Formula (I), or a pharmaceutically or nutraceutically acceptable salt, hydrate, or solvate thereof.

In any of the pharmaceutical compositions, nutraceutical compositions, food products, beverages, or nutritional supplements described herein, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 1% to about 99%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 10% to about 99%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 10% to about 90%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 10% to about 80%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 10% to about 70%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 10% to about 60%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 10% to about 50%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 10% to about 40%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 10% to about 25%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 25% to about 99%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 25% to about 90%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 25% to about 80%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 25% to about 70%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 25% to about 60%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 25% to about 50%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 25% to about 40%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 30% to about 99%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 30% to about 90%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 30% to about 80%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 30% to about 70%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 30% to about 60%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 30% to about 50%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 40% to about 99%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 40% to about 90%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 40% to about 80%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 40% to about 70%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 40% to about 60%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 40% to about 50%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 50% to about 99%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 50% to about 90%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 50% to about 80%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 50% to about 70%. In another aspect, the percentage of the amount of the compound of Formula (I), or a pharmaceutically or nutraceutically acceptable salt, hydrate, or solvate thereof, relative to the total amount of caffeine present in the composition, food product, beverage, or nutritional supplement ranges from about 50% to about 60%.

In another aspect, the compound of Formula (I), or a pharmaceutically or nutraceutically acceptable salt, hydrate, or solvate thereof, is included in an amount from about 0.001% to 50% based on the weight of all the components of the composition, food product, beverage, or nutritional supplement. In certain embodiments, the compound of Formula (I), or a pharmaceutically or nutraceutically acceptable salt, hydrate, or solvate thereof, is included in an amount from about 0.1% to 5% (e.g., 0.1% to 1%, 1% to 5%) based on the weight of all the components of the composition, food product, beverage, or nutritional supplement. In certain embodiments, the compound of Formula (I), or a pharmaceutically or nutraceutically acceptable salt, hydrate, or solvate thereof, is included in an amount from about 5% to 20% based on the weight of all the components of the composition, food product, beverage, or nutritional supplement. In certain embodiments, the compound of Formula (I), or a pharmaceutically or nutraceutically acceptable salt, hydrate, or solvate thereof, is included in an amount from about 20% to 50% based on the weight of all the components of the composition, food product, beverage, or nutritional supplement.

It will be understood that the total daily usage of the pharmaceutical composition described herein may be decided by an attending physician within the scope of sound medical judgment, and will depend safety and toxicity profile of the components of the pharmaceutical composition. The specific therapeutically effective dose level for any particular patient or organism will depend upon a variety of factors including the disorder being treated and the severity of the disorder; the clinical studies results, the activity of the specific compound employed; the specific pharmaceutical composition employed; the age, body weight, general health, sex and diet of the patient; the time of administration, route of administration, and rate of excretion of the specific compound employed; the duration of the treatment; drugs used in combination or coincidental with the specific compound employed; and like factors well known in the medical arts (see, for example, Goodman and Gilman's, *The Pharmacological Basis of Therapeutics*, Tenth Edition, A. Gilman, J. Hardman, and L. Limbird, eds., McGraw-Hill Press, 155-173, 2001).

In another aspect, any of the pharmaceutical compositions described herein may be suitable for oral administration, parenteral (e.g., intravenous (IV)) administration, topical administration, inhalation, buccal administration, or for delivery to the lungs. In another aspect, the pharmaceutical composition is suitable for oral administration. In another aspect, the pharmaceutical composition is suitable for parenteral administration. In another aspect, the pharmaceutical composition is suitable for intravenous (IV) administration. In another aspect, the pharmaceutical composition is suitable for topical administration. In another aspect, the pharmaceutical composition is suitable for delivery to the lungs.

In another aspect, any of the nutraceutical compositions described herein may be suitable for oral administration.

In another aspect, the composition is a cosmetic composition. In another aspect, the cosmetic composition is suitable for topical administration.

In another aspect, any of the pharmaceutical or nutraceutical compositions described herein suitable for oral administration may be a solid dose composition. In another aspect, the solid dose composition may be a tablet, capsule, granule, powder, sachet, or chewable.

In another aspect, any of the pharmaceutical, nutraceutical, or cosmetic compositions described herein suitable for topical administration may be a shampoo, conditioner, shampoo, conditioner, cream, foam, gel, lotion, ointment, transdermal patch, tincture, or paste.

In another aspect, any of the pharmaceutical compositions described herein suitable for delivery to the lungs may be administered using an electronic cigarette or other vaping device, a nebulizer, a pressurized metered dose inhaler (pMDI), or a dry powder inhaler (DPI).

In another aspect, any of the pharmaceutical, nutraceutical, or cosmetic compositions described herein may further comprise a pharmaceutically or nutraceutically acceptable carrier.

In another aspect, any of the pharmaceutical, nutraceutical, or cosmetic compositions described herein may further comprise an additional agent. In another aspect, the additional agent refers to natural or synthetic compound(s) capable of activity or other direct effect in the diagnosis, cure, mitigation, treatment or prevention of disease or to affect the structure and function of the body. In any of the foregoing embodiments, a provided composition may contain one or more active agents, including, but not limiting to pharmaceutical agent that belong to different Biopharmaceutics Classification System (BCS), for example, from BCS class I, II, III or IV, and/or peptides, and/or vaccines and/or nucleic acid-based products and/or immunologic agents and/or phytopharmaceutical agents and/or nutraceutical agents and/or cosmetic agents and/or supplements. In certain embodiments, the active agent is a small molecule (e.g., when the molecular weight is lower than 500, 800, 1000, or 1500, g/mol). In certain embodiments, the active agent is a drug approved by the U.S. Food and Drug Administration and/or the European Medicines Agency.

In the present invention, each additional agent may be incorporated in the composition. Depending upon the qualitative and quantitative composition of the formulation chosen, the additional agent(s) may be released from the composition over a period of time (i.e. sustained release) or immediately. The present invention can be used in the treatment of both humans and animals.

In another aspect, the additional agent is ergotamine, an anti-inflammatory agent, a steroid, a barbiturate, an opioid analgesic, or a combination thereof. In another aspect, any of the hydrogen atoms in ergotamine, the anti-inflammatory agent, the steroid, the barbiturate, or the opioid analgesic may be replaced with deuterium. In another aspect, the anti-inflammatory agent is a cyclooxygenase-3 (COX-3) inhibitor, a non-steroidal anti-inflammatory drug (NSAID), or a cyclooxygenase-2 (COX-2) inhibitor.

In another aspect, the NSAID is ibuprofen, naproxen, sulindac, ketoprofen, tolmetin, etodolac, fenoprofen, diclofenac, flurbiprofen, piroxicam, ketorolac, indomethacin, nabumetone, oxaprozin, mefanamic acid, or diflunisal.

In another aspect, the opioid analgesic is codeine, fentanyl, hydrocodone, hydromorphone, meperidine, methadone, morphine, or oxycodone.

In another aspect, the barbiturate is secobarbital, mephobarbital, pentobarbital, butabarbital, phenobarbital, or amobarbital.

In another aspect, the COX-2 inhibitor is celecoxib, valdecoxib, rofecoxib, or etoricoxib.

In another aspect, the COX-3 inhibitor is acetaminophen, phenacetin, antipyrine, or dipyrone.

In another aspect, the percentage of deuterium (i.e. the percentage of hydrogen atoms replaced by deuterium atoms) in ergotamine, the anti-inflammatory agent, the steroid, the barbiturate, or the opioid analgesic is at least 5%. In another aspect, the percentage of deuterium in ergotamine, the anti-inflammatory agent, the steroid, the barbiturate, or the opioid analgesic is at least 10%. In another aspect, the percentage of deuterium in ergotamine, the anti-inflammatory agent, the steroid, the barbiturate, or the opioid analgesic is at least 15%. In another aspect, the percentage of deuterium in ergotamine, the anti-inflammatory agent, the steroid, the barbiturate, or the opioid analgesic is at least 20%. In another aspect, the percentage of deuterium in ergotamine, the anti-inflammatory agent, the steroid, the barbiturate, or the opioid analgesic is at least 25%. In another aspect, the percentage of deuterium in ergotamine, the anti-inflammatory agent, the steroid, the barbiturate, or the opioid analgesic is at least 30%. In another aspect, the percentage of deuterium in ergotamine, the anti-inflammatory agent, the steroid, the barbiturate, or the opioid analgesic is at least 40%. In another aspect, the percentage of deuterium in ergotamine, the anti-inflammatory agent, the steroid, the barbiturate, or the opioid analgesic is at least 50%. In another aspect, the percentage of deuterium in ergotamine, the anti-inflammatory agent, the steroid, the barbiturate, or the opioid analgesic is at least 60%. In another aspect, the percentage of deuterium in ergotamine, the anti-inflammatory agent, the steroid, the barbiturate, or the opioid analgesic is at least 70%. In another aspect, the percentage of deuterium in ergotamine, the anti-inflammatory agent, the steroid, the barbiturate, or the opioid analgesic is at least 80%. In another aspect, the percentage of deuterium in ergotamine, the anti-inflammatory agent, the steroid, the barbiturate, or the opioid analgesic is at least 90%. In another aspect, the percentage of deuterium in ergotamine, the anti-inflammatory agent, the steroid, the barbiturate, or the opioid analgesic is at least 95%. In another aspect, the percentage of deuterium in ergotamine, the anti-inflammatory agent, the steroid, the barbiturate, or the opioid analgesic is at least 97%. In another aspect, the percentage of deuterium in ergotamine, the anti-inflammatory agent, the steroid, the barbiturate, or the opioid analgesic is at least 99%.

In certain embodiments, the composition further comprises a sweetener. Sweeteners can be used to improve palatability and are usually classified as natural or artificial. A sweetener may be a natural sweetener or artificial sweetener. Exemplary natural sweeteners include, but are not limited to, dextrose, fructose, glucose, liquid glucose, maltose, rebiana, glycyrrhizin, thaumatin, sorbitol, mannitol, isomalt, glycerol, maltitol, xylitol, and erythritol. Exemplary artificial sweeteners include, but are not limited to, saccharin, cyclamate, aspartame, acesulfame-K, sucralose, alitame and neotame. In certain embodiments, sucralose is used as a sweetener. In certain embodiments, one or combination of neohespiridin dihydrochalcone, glycerol and/or sucralose are used as sweeteners. In some embodiments, the concentration of the sweetener in the composition is between 0.01% and 5%, inclusive, by weight. In some embodiments, the concentration of the sweetener in the composition is between 0.01% and 1%, inclusive, by weight. In some embodiments, the concentration of the sweetener in the composition is between 0.5% and 1%, inclusive, by weight. In certain embodiments, the composition further comprises sucralose. In certain embodiments, the composition further comprises sucralose as about 0.01-0.25% based on the dry weight of all the components of the composition.

In certain embodiments, a composition further comprises a colorant. A colorant can be added to enhance the aesthetic appeal of the composition, especially when formulation ingredients or drugs are presented in a non-solution form. Generally, any colorant could be added, such as for example FD&C pigments (for example, blue n°1, blue n°2, red n°3, red n°40, yellow n°5, or yellow n° 6). Exemplary colorants include, but are not limited to annatto extract, dehydrated beets (beet powder), canthaxanthin, caramel, β-apo-8'-carotenal, β-carotene, cochineal extract, carmine, sodium copper chlorophyllin, toasted partially defatted cooked cottonseed flour, ferrous gluconate, ferrous lactate, grape color extract, grape skin extract (enocianina), synthetic iron oxide, fruit juice, vegetable juice, carrot oil, paprika, paprika oleoresin, mica-based pearlescent pigments, riboflavin, saffron, spirulina extract, titanium dioxide, tomato lycopene extract; tomato lycopene concentrate, turmeric, turmeric oleoresin, alumina (dried aluminum hydroxide), calcium carbonate, potassium sodium copper chlorophyllin (chlorophyllin-copper complex), dihydroxyacetone, bismuth oxychloride, synthetic iron oxide, ferric ammonium ferrocyanide, ferric ferrocyanide, chromium hydroxide green, chromium oxide greens, guanine, pyrophyllite, mica, talc, aluminum powder, bronze powder, copper powder, zinc oxide, bismuth citrate, disodium EDTA-copper, guaiazulene, henna, lead acetate, pyrophyllite, silver, ultramarines, manganese violet, luminescent zinc sulfide, FD&C Blue No. 1, FD&C Blue No. 2, FD&C Green No. 3, Orange B, Citrus Red No. 2, FD&C Red No. 3, FD&C Red No. 40, FD&C Yellow No. 5, FD&C Yellow No. 6, D&C Blue No. 4, D&C Green No. 5, D&C Green No. 6, D&C Green No. 8, D&C Orange No. 4, D&C Orange No. 5, D&C Orange No. 10, D&C Orange No. 11, FD&C Red No. 4, D&C Red No. 6, D&C Red No. 7, D&C Red No. 17, D&C Red No. 21, D&C Red No. 22, D&C Red No. 27, D&C Red No. 28, D&C Red No. 30, D&C Red No. 31, D&C Red No. 33, D&C Red No. 34, D&C Red No. 36, D&C Red No. 39, D&C Violet No. 2, D&C Yellow No. 7, Ext. D&C Yellow No. 7, D&C Yellow No. 8, D&C Yellow No. 10, D&C Yellow No. 11, D&C Black No. 2, D&C Black No. 3, D&C Brown No. 1, and Ext. D&C Violet No. 2. In certain embodiments, a colorant represents 0.001% to about 0.5% based on the weight of all the components of the composition. In some embodiments, the concentration of the colorant in the composition is between 0.001% and 5%, inclusive, by weight. In some embodiments, the concentration of the colorant in the composition is between 0.001% and 1%, inclusive, by weight.

In certain embodiments, a provided composition further comprises a flavoring agent. In certain embodiments, the selection of a suitable flavoring agent to be added depends on the original taste sensation of the composition, including metallic, acidic, alkaline, salty, sweet, bitter and sour taste sensation. Certain flavoring agents, alone or in combination, mask specific taste sensations. For example, metallic taste could be masked with, but not limited to, flavoring agents based on berry fruits, grape, and/or peppermint. For example, acidic taste could be masked with, but not limited to, flavoring agents based on lemon, lime, grapefruit, orange, cherry, and/or strawberry. For example, alkaline taste could be masked with, but not limited to, flavoring agents based on aniseed, caramel, passion fruit, peach and/or banana. For example, salty taste could be masked with, but not limited to, flavoring agents based on butterscotch, caramel, hazelnut, spicy, maple, apricot, apple, peach, vanilla, and/or wintergreen mint. For example, bitter taste could be masked with, but not limited to, flavoring agents based on licorice, passion fruit, coffee, chocolate, peppermint, grapefruit, cherry, peach, raspberry, wild cherry, walnut, mint and/or anise. For example, sweet taste could be masked with, but not limited to, flavoring agents based on grape, cream, caramel, banana, vanilla and/or fruit berry. For example, sour taste could be masked with, but not limited to, flavoring agents based on citrus flavors, licorice, root, bear and/or raspberry. Flavoring agents can be used alone or in combination and its selection will be dependent also upon the target population and any other substance (e.g., a pharmaceutical or nutraceutical agent) incorporated in the composition. The perception of the flavoring agent changes from individual to individual and also with age: typically a geriatric population will prefer mint or orange flavors whereas younger populations tend to prefer flavors like fruit punch, raspberry, etc. Generally, the amount of flavoring agent needed to mask an unpleasant taste or improve taste overall will depend not only on the composition of the formulation but also on the flavor type and its strength.

In certain embodiments, a flavoring agent is a palatable flavor that has a long shelf life and which does not crystallize or precipitate out of the composition upon storage. In certain embodiments, flavoring agents may be natural flavors, derived from various parts of the plants like leaves, fruits and flowers, or synthetic flavor oils or powders. Exemplary flavor oils that may be used in or as flavoring agents include, but are not limited to, peppermint oil, cinnamon oil, spearmint oil, and oil of nutmeg. Exemplary fruity flavors that may be used in or as flavoring agents include, but are not limited to, vanilla, cocoa, coffee, chocolate and citrus. Exemplary fruit essence flavors that may be used in or as flavoring agents include, but are not limited to, apple, raspberry, cherry, and pineapple. The amount of flavoring agent added can vary with the flavor employed. In some embodiments, the concentration of the flavoring agent in the composition is between about 0% and 5%, by weight. In some embodiments, the concentration of the flavoring agent in the composition is between 0.001% and 5%, inclusive, by weight. In some embodiments, the concentration of the flavoring agent in the composition is between 0.1% and 1%, inclusive, by weight. In some embodiments, the concentration of the flavoring agent in the composition is between 0.5% and 1%, inclusive, by weight.

In certain embodiments, a provided composition further comprises taste-masking. Taste-masking agents can be added to ameliorate the general organoleptic characteristics of the compositions. In certain embodiments, taste-masking agents may be used to mask unpleasant taste of some components. The main taste sensations include metallic, acidic, alkaline, salty, sweet, bitter and sour. Exemplary of taste-masking agents include, but are not limited to, menthol, peppermint oil, L-Menthol, cyclodextrins, glycerol, maltodextrins, ion-exchange resins, amino acids, gelatin, gelatinized starch, liposomes, lecithin or lecithin-like substances and salts. The amount of taste-masking added can vary with the taste-masking employed. In certain embodiments, the taste-masking agent comprises about 0% to about 50% based on the dry weight of all the components of the composition. In certain embodiments, the taste-masking agent represents 0% to about 5% based on the dry weight of all the components of the composition.

In another aspect, a provided composition further comprises a cooling agent. Cooling agents may also be added in order to improve the after-taste of the composition. Exemplary cooling agents include, but are not limited to, neohesperidine dihydrochalcone, menthol flavor, L-Menthol and some polyol sugars which are widely used for this purpose. Other components can also be added that should compete with sensory stimuli, such as Cremophor (which is used to coat the surface protein receptors), or saline solutions (e.g. sodium chloride, which competes within channel receptors with the bitter stimuli to reduce the overall perception of bitterness). In certain embodiments, the cooling agents in the composition is one or a combination of neohesperidine dihydrochalcone, menthol and/or polyol sugar. In certain embodiments, the mucoadhesive composition further comprises cooling agents of about 0% to about 5% based on the weight of all the components of the composition. In certain embodiments, the mucoadhesive composition further comprises cooling agents as about 0.001% to about 2.5% based on the weight of all the components of the composition.

In certain embodiments, a provided composition further comprises one or more preservatives. The preservative employed in the invention can be any preservative, as long as does not negate other desirable properties of the composition. Example of a preservative is an antimicrobial preservative that is used to prevent or inhibit the growth of micro-organisms in the composition. Exemplary preservative agents include, but are not limited to, $C_3$-$C_8$ alcohols, phenylethyl alcohol, chlorbutanol, p-hydroxybenzoic, acid esters, benzathonium chloride and benzalkonium chloride, benzoic acid, propyl galate, methylparaben, propylparaben, sorbic acid, sodium benzoate and/or potassium sorbate. The amount of preservative agent added can vary with the preservative agent employed. In certain embodiments, a preservative agent represents about 0% to about 45% based on the weight of all the components of the composition. In certain embodiments, a preservative agent represents about 0% to about 1% (e.g., 0.025% to 0.2%) based on the weight of all the components of the composition.

In certain embodiments, a provided composition (e.g., cosmetic or pharmaceutical composition) further comprises penetration enhancement additives. Penetration enhancers effectively increase permeability of active agents and/or composition excipients. Preferably, penetration enhancement additives are compatible with the active agents and other formulation excipients, pharmacologically inert, non-toxic and inexpensive. Exemplary penetration enhancement additives include, but are not limited to, bile salts, surfactants, fatty acids and derivatives, glycerides, chelators, salicylates, polymers, or other compounds. Exemplary of bile salts that act as Penetration enhancement additives include, but are not limited to, Sodium glycocholate, sodium deoxycholate, sodium taurocholate, sodium fusidate, sodium glycodeoxycholate, sodium taurodihydrofusidate. Exemplary of surfactants that act as penetration enhancement additives include, but are not limited to, sodium lauryl sulfate, brij1-35, lysophosphatidylcholine, dioctyl sodium sulfosuccinate, laurenth-9, polysorbate-80, polyethyleneglycol-8-laurate, glyceryl monolaurate. Exemplary of fatty acids and derivatives that act as Penetration enhancement additives include, but are not limited to, sorbitan laurate, sodium caprate, sucrose palmitate, lauroyl choline, sodium myristate, palmitoyl carnitine. Exemplary of glycerides that act as penetration enhancement additives include, but are not limited to phospholipids, monohexanoin, medium chain glycerides. Exemplary of chelators that act as penetration enhancement additives include, but are not limited to ethylene diamine tetraacetate (EDTA), disodium EDTA. Exemplary of salicylates that act as penetration enhancement additives include, but are not limited to salicylic acid, sodium methoxysalicylate, acetyl salicylic acid. Exemplary of polymers that act as penetration enhancement additives include, but are not limited to chitosan, polycarbophil, sodium carboxymethylcellulose and their derivatives. Exemplary of other compounds that act as Penetration enhancement additives include, but are not limited to cyclodextrins, benzalkonium chloride, phenothiazines, nitric acid donors, menthol, zonula occluden toxin, poly-1-arginines, soybean derivative glucosides, citicholine, α-acid derivatives. The amount of penetration enhancement additives added can vary with the Penetration enhancement additives agent employed.

In one aspect, the invention provides a beverage comprising deuterated caffeine. In another aspect, the beverage comprises one or more of water, flavoring agent(s), sweetener(s), vitamins, minerals, co-factors, proteins, lipids, peptides, and amino acids.

In another aspect, the invention provides a beverage comprising water and a compound of Formula (I):

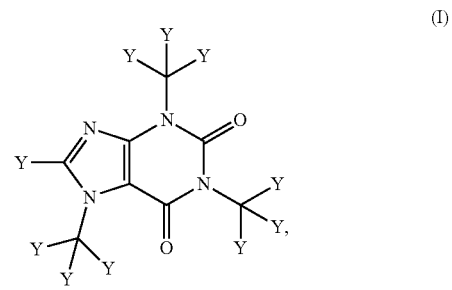

or a pharmaceutically or nutraceutically acceptable salt, hydrate, or solvate thereof;

wherein each Y is independently hydrogen or deuterium; and at least one Y is deuterium.

In another aspect, the beverage further comprises one or more of a flavoring and a sweetener.

In another aspect, the beverage further comprises one or more of vitamins, minerals, co-factors, proteins, lipids, peptides, and amino acids.

In another aspect, the beverage is an energy beverage. In another aspect, the energy beverage further comprises one or more of water, taurine, citicoline, vitamin B6, vitamin B12, folic acid, niacinamide, glucuronolactone, N-acetyl-L-tyrosine, L-phenylalanine, and malic acid.

In another aspect, the beverage is a vitamin water. In another aspect, the vitamin water further comprises one or more of water, vitamin C, vitamin B5, vitamin B6, vitamin B12, magnesium, and pantothenic acid.

In another aspect, the beverage is a coffee (decaffeinated or comprising non-isotopically enriched caffeine) that is enhanced or "spiked" with the compound of Formula (I), or a pharmaceutically or nutraceutically acceptable salt, hydrate, or solvate thereof.

In another aspect, the beverage comprises about 1 mg to about 1000 mg of the compound of Formula (I), or a pharmaceutically or nutraceutically acceptable salt, hydrate, or solvate thereof. In another aspect, the beverage comprises about 1 mg to about 800 mg of the compound of Formula (I), or a pharmaceutically or nutraceutically acceptable salt, hydrate, or solvate thereof. In another aspect, the beverage comprises about 1 mg to about 600 mg of the compound of Formula (I), or a pharmaceutically or nutraceutically acceptable salt, hydrate, or solvate thereof. In another aspect, the beverage comprises about 1 mg to about 400 mg of the compound of Formula (I), or a pharmaceutically or nutraceutically acceptable salt, hydrate, or solvate thereof. In another aspect, the beverage comprises about 1 mg to about 300 mg of the compound of Formula (I), or a pharmaceutically or nutraceutically acceptable salt, hydrate, or solvate thereof. In another aspect, the beverage comprises about 1 mg to about 250 mg of the compound of Formula (I), or a pharmaceutically or nutraceutically acceptable salt, hydrate, or solvate thereof. In another aspect, the beverage comprises about 1 mg to about 200 mg of the compound of Formula (I), or a pharmaceutically or nutraceutically acceptable salt, hydrate, or solvate thereof. In another aspect, the beverage comprises about 1 mg to about 125 mg of the compound of Formula (I), or a pharmaceutically or nutraceutically acceptable salt, hydrate, or solvate thereof. In another aspect, the beverage comprises about 5 mg to about 75 mg of the compound of Formula (I), or a pharmaceutically or nutraceutically acceptable salt, hydrate, or solvate thereof. In another aspect, the beverage comprises about 10 mg to about 200 mg of the compound of Formula (I), or a pharmaceutically or nutraceutically acceptable salt, hydrate, or solvate thereof. In another aspect, the beverage comprises about 10 mg to about 150 mg of the compound of Formula (I), or a pharmaceutically or nutraceutically acceptable salt, hydrate, or solvate thereof. In another aspect, the beverage comprises about 10 mg to about 100 mg of the compound of Formula (I), or a pharmaceutically or nutraceutically acceptable salt, hydrate, or solvate thereof. In another aspect, the beverage comprises about 10 mg to about 75 mg of the compound of Formula (I), or a pharmaceutically or nutraceutically acceptable salt, hydrate, or solvate thereof. In another aspect, the beverage comprises about 10 mg to about 50 mg of the compound of Formula (I), or a pharmaceutically or nutraceutically acceptable salt, hydrate, or solvate thereof. In another aspect, the beverage comprises about 20 mg to about 200 mg of the compound of Formula (I), or a pharmaceutically or nutraceutically acceptable salt, hydrate, or solvate thereof. In another aspect, the beverage comprises about 20 mg to about 150 mg of the compound of Formula (I), or a pharmaceutically or nutraceutically acceptable salt, hydrate, or solvate thereof. In another aspect, the beverage comprises about 20 mg to about 100 mg of the compound of Formula (I), or a pharmaceutically or nutraceutically acceptable salt, hydrate, or solvate thereof. In another aspect, the beverage comprises about 20 mg to about 75 mg of the compound of Formula (I), or a pharmaceutically or nutraceutically acceptable salt, hydrate, or solvate thereof. In another aspect, the beverage comprises about 20 mg to about 50 mg of the compound of Formula (I), or a pharmaceutically or nutraceutically acceptable salt, hydrate, or solvate thereof.

In another aspect, any of the beverage comprises about 1 mg/ml to about 100 mg/ml of the compound of Formula (I), or a pharmaceutically or nutraceutically acceptable salt, hydrate, or solvate thereof. In another aspect, the beverage comprises about 1 mg/ml to about 75 mg/ml of the compound of Formula (I), or a pharmaceutically or nutraceutically acceptable salt, hydrate, or solvate thereof. In another aspect, the beverage comprises about 1 mg/ml to about 50 mg/ml of the compound of Formula (I), or a pharmaceutically or nutraceutically acceptable salt, hydrate, or solvate thereof. In another aspect, the beverage comprises about 1 mg/ml to about 25 mg/ml of the compound of Formula (I), or a pharmaceutically or nutraceutically acceptable salt, hydrate, or solvate thereof. In another aspect, the beverage comprises about 2 mg/ml to about 100 mg/ml of the compound of Formula (I), or a pharmaceutically or nutraceutically acceptable salt, hydrate, or solvate thereof. In another aspect, the beverage comprises about 2 mg/ml to about 75 mg/ml of the compound of Formula (I), or a pharmaceutically or nutraceutically acceptable salt, hydrate, or solvate thereof. In another aspect, the beverage comprises about 2 mg/ml to about 50 mg/ml of the compound of Formula (I), or a pharmaceutically or nutraceutically acceptable salt, hydrate, or solvate thereof. In another aspect, the beverage comprises about 2 mg/ml to about 25 mg/ml of the compound of Formula (I), or a pharmaceutically or nutraceutically acceptable salt, hydrate, or solvate thereof. In another aspect, the beverage comprises about 2 mg/ml to about 15 mg/ml of the compound of Formula (I), or a pharmaceutically or nutraceutically acceptable salt, hydrate, or solvate thereof. In another aspect, the beverage comprises about 5 mg/ml to about 100 mg/ml of the compound of Formula (I), or a pharmaceutically or nutraceutically acceptable salt, hydrate, or solvate thereof. In another aspect, the beverage comprises about 5 mg/ml to about 75 mg/ml of the compound of Formula (I), or a pharmaceutically or nutraceutically acceptable salt, hydrate, or solvate thereof. In another aspect, the beverage comprises about 5 mg/ml to about 50 mg/ml of the compound of Formula (I), or a pharmaceutically or nutraceutically acceptable salt, hydrate, or solvate thereof. In another aspect, the beverage comprises about 5 mg/ml to about 25 mg/ml of the compound of Formula (I), or a pharmaceutically or nutraceutically acceptable salt, hydrate, or solvate thereof. In another aspect, the beverage comprises about 5 mg/ml to about 15 mg/ml of the compound of Formula (I), or a pharmaceutically or nutraceutically acceptable salt, hydrate, or solvate thereof. In another aspect, the beverage comprises about 10 mg/ml to about 100 mg/ml of the compound of Formula (I), or a pharmaceutically or nutraceutically acceptable salt, hydrate, or solvate thereof. In another aspect, the beverage comprises about 10 mg/ml to about 75 mg/ml of the compound of Formula (I), or a pharmaceutically or nutraceutically acceptable salt, hydrate, or solvate thereof. In another aspect, the beverage comprises about 10 mg/ml to about 50 mg/ml of the compound of Formula (I), or a pharmaceutically or nutraceutically acceptable salt, hydrate, or solvate thereof. In another aspect, the beverage comprises about 10 mg/ml to about 25 mg/ml of the compound of Formula (I), or a pharmaceutically or nutraceutically acceptable salt, hydrate, or solvate thereof.

In another aspect, the percentage of the amount of the compound of Formula (I), or a pharmaceutically or nutraceutically acceptable salt, hydrate, or solvate thereof, relative to the total amount of caffeine present in the beverage ranges from about 1% to about 99%. In another aspect, the percentage of the amount of the compound of Formula (I), or a pharmaceutically or nutraceutically acceptable salt, hydrate, or solvate thereof, relative to the total amount of caffeine present in the beverage ranges from about 10% to about 99%. In another aspect, the percentage of the amount of the compound of Formula (I), or a pharmaceutically or nutraceutically acceptable salt, hydrate, or solvate thereof, relative to the total amount of caffeine present in the beverage ranges from about 10% to about 90%. In another aspect, the percentage of the amount of the compound of Formula (I), or a pharmaceutically or nutraceutically acceptable salt, hydrate, or solvate thereof, relative to the total amount of caffeine present in the beverage ranges from about 10% to about 80%. In another aspect, the percentage of the amount of the compound of Formula (I), or a pharmaceutically or nutraceutically acceptable salt, hydrate, or solvate thereof, relative to the total amount of caffeine present in the beverage ranges from about 10% to about 70%. In another aspect, the percentage of the amount of the compound of Formula (I), or a pharmaceutically or nutraceutically acceptable salt, hydrate, or solvate thereof, relative to the total amount of caffeine present in the beverage ranges from about 10% to about 60%. In another aspect, the percentage of the amount of the compound of Formula (I), or a pharmaceutically or nutraceutically acceptable salt, hydrate, or solvate thereof, relative to the total amount of caffeine present in the beverage ranges from about 10% to about 50%. In another aspect, the percentage of the amount of the compound of Formula (I), or a pharmaceutically or nutraceutically acceptable salt, hydrate, or solvate thereof, relative to the total amount of caffeine present in the beverage ranges from about 10% to about 40%. In another aspect, the percentage of the amount of the compound of Formula (I), or a pharmaceutically or nutraceutically acceptable salt, hydrate, or solvate thereof, relative to the total amount of caffeine present in the beverage ranges from about 10% to about 25%. In another aspect, the percentage of the amount of the compound of Formula (I), or a pharmaceutically or nutraceutically acceptable salt, hydrate, or solvate thereof, relative to the total amount of caffeine present in the beverage ranges from about 25% to about 99%. In another aspect, the percentage of the amount of the compound of Formula (I), or a pharmaceutically or nutraceutically acceptable salt, hydrate, or solvate thereof, relative to the total amount of caffeine present in the beverage ranges from about 25% to about 90%. In another aspect, the percentage of the amount of the compound of Formula (I), or a pharmaceutically or nutraceutically acceptable salt, hydrate, or solvate thereof, relative to the total amount of caffeine present in the beverage ranges from about 25% to about 80%. In another aspect, the percentage of the amount of the compound of Formula (I), or a pharmaceutically or nutraceutically acceptable salt, hydrate, or solvate thereof, relative to the total amount of caffeine present in the beverage ranges from about 25% to about 70%. In another aspect, the percentage of the amount of the compound of Formula (I), or a pharmaceutically or nutraceutically acceptable salt, hydrate, or solvate thereof, relative to the total amount of caffeine present in the beverage ranges from about 25% to about 60%. In another aspect, the percentage of the amount of the compound of Formula (I), or a pharmaceutically or nutraceutically acceptable salt, hydrate, or solvate thereof, relative to the total amount of caffeine present in the beverage ranges from about 25% to about 50%. In another aspect, the percentage of the amount of the compound of Formula (I), or a pharmaceutically or nutraceutically acceptable salt, hydrate, or solvate thereof, relative to the total amount of caffeine present in the beverage ranges from about 25% to about 40%. In another aspect, the percentage of the amount of the compound of Formula (I), or a pharmaceutically or nutraceutically acceptable salt, hydrate, or solvate thereof, relative to the total amount of caffeine present in the beverage ranges from about 30% to about 99%. In another aspect, the percentage of the amount of the compound of Formula (I), or a pharmaceutically or nutraceutically acceptable salt, hydrate, or solvate thereof, relative to the total amount of caffeine present in the beverage ranges from about 30% to about 90%. In another aspect, the percentage of the amount of the compound of Formula (I), or a pharmaceutically or nutraceutically acceptable salt, hydrate, or solvate thereof, relative to the total amount of caffeine present in the beverage ranges from about 30% to about 80%. In another aspect, the percentage of the amount of the compound of Formula (I), or a pharmaceutically or nutraceutically acceptable salt, hydrate, or solvate thereof, relative to the total amount of caffeine present in the beverage ranges from about 30% to about 70%. In another aspect, the percentage of the amount of the compound of Formula (I), or a pharmaceutically or nutraceutically acceptable salt, hydrate, or solvate thereof, relative to the total amount of caffeine present in the beverage ranges from about 30% to about 60%. In another aspect, the percentage of the amount of the compound of Formula (I), or a pharmaceutically or nutraceutically acceptable salt, hydrate, or solvate thereof, relative to the total amount of caffeine present in the beverage ranges from about 30% to about 50%. In another aspect, the percentage of the amount of the compound of Formula (I), or a pharmaceutically or nutraceutically acceptable salt, hydrate, or solvate thereof, relative to the total amount of caffeine present in the beverage ranges from about 40% to about 99%. In another aspect, the percentage of the amount of the compound of Formula (I), or a pharmaceutically or nutraceutically acceptable salt, hydrate, or solvate thereof, relative to the total amount of caffeine present in the beverage ranges from about 40% to about 90%. In another aspect, the percentage of the amount of the compound of Formula (I), or a pharmaceutically or nutraceutically acceptable salt, hydrate, or solvate thereof, relative to the total amount of caffeine present in the beverage ranges from about 40% to about 80%. In another aspect, the percentage of the amount of the compound of Formula (I), or a pharmaceutically or nutraceutically acceptable salt, hydrate, or solvate thereof, relative to the total amount of caffeine present in the beverage ranges from about 40% to about 70%. In another aspect, the percentage of the amount of the compound of Formula (I), or a pharmaceutically or nutraceutically acceptable salt, hydrate, or solvate thereof, relative to the total amount of caffeine present in the beverage ranges from about 40% to about 60%. In another aspect, the percentage of the amount of the compound of Formula (I), or a pharmaceutically or nutraceutically acceptable salt, hydrate, or solvate thereof, relative to the total amount of caffeine present in the beverage ranges from about 40% to about 50%. In another aspect, the percentage of the amount of the compound of Formula (I), or a pharmaceutically or nutraceutically acceptable salt, hydrate, or solvate thereof, relative to the total amount of caffeine present in the beverage ranges from about 50% to about 99%. In another aspect, the percentage of the amount of the compound of Formula (I), or a pharmaceutically or nutraceutically acceptable salt, hydrate, or solvate thereof, relative to the total amount of caffeine present in the beverage ranges from about 50% to about 90%. In another aspect, the percentage of the amount of the compound of Formula (I), or a pharmaceutically or nutraceutically acceptable salt, hydrate, or solvate thereof, relative to the total amount of caffeine present in the beverage ranges from about 50% to about 80%. In another aspect, the percentage of the amount of the compound of Formula (I), or a pharmaceutically or nutraceutically acceptable salt, hydrate, or solvate thereof, relative to the total amount of caffeine present in the beverage ranges from about 50% to about 70%. In another aspect, the percentage of the amount of the compound of Formula (I), or a pharmaceutically or nutraceutically acceptable salt, hydrate, or solvate thereof, relative to the total amount of caffeine present in the beverage ranges from about 50% to about 60%.

In another aspect, the invention provides a food product comprising a compound of Formula (I):

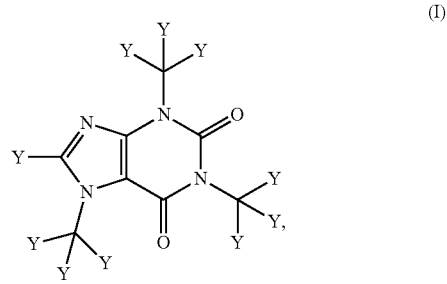

or a pharmaceutically or nutraceutically acceptable salt, hydrate, or solvate thereof;

wherein each Y is independently hydrogen or deuterium; and at least one Y is deuterium.

In another aspect, the food product is any item that is to be processed, partially processed, or unprocessed for consumption. In another aspect, the food product is an energy bar, energy gel, pre-work out supplement, or other performance enhancing supplements. In another aspect, the food product is a food additive. In another aspect, the food product is an energy bar. In another aspect, the energy bar further comprises one or more of sugar, cocoa butter, chocolate liquor, whole milk powder, soy lecithin, vanilla extract, caramel, peanuts, peanut butter, almonds, oats, molasses, cinnamon, salt, and soybean oil.

In another aspect, the food product may comprise about 1 mg to about 1000 mg of the compound of Formula (I), or a pharmaceutically or nutraceutically acceptable salt, hydrate, or solvate thereof. In another aspect, the food product may comprise about 1 mg to about 800 mg of the compound of Formula (I), or a pharmaceutically or nutraceutically acceptable salt, hydrate, or solvate thereof. In another aspect, the food product may comprise about 1 mg to about 600 mg of the compound of Formula (I), or a pharmaceutically or nutraceutically acceptable salt, hydrate, or solvate thereof. In another aspect, the food product may comprise about 1 mg to about 400 mg of the compound of Formula (I), or a pharmaceutically or nutraceutically acceptable salt, hydrate, or solvate thereof. In another aspect, the food product may comprise about 1 mg to about 300 mg of the compound of Formula (I), or a pharmaceutically or nutraceutically acceptable salt, hydrate, or solvate thereof. In another aspect, the food product may comprise about 1 mg to about 250 mg of the compound of Formula (I), or a pharmaceutically or nutraceutically acceptable salt, hydrate, or solvate thereof. In another aspect, the food product may comprise about 1 mg to about 200 mg of the compound of Formula (I), or a pharmaceutically or nutraceutically acceptable salt, hydrate, or solvate thereof. In another aspect, the food product may comprise about 1 mg to about 125 mg of the compound of Formula (I), or a pharmaceutically or nutraceutically acceptable salt, hydrate, or solvate thereof. In another aspect, the food product may comprise about 5 mg to about 75 mg of the compound of Formula (I), or a pharmaceutically or nutraceutically acceptable salt, hydrate, or solvate thereof. In another aspect, the food product may comprise about 10 mg to about 200 mg of the compound of Formula (I), or a pharmaceutically or nutraceutically acceptable salt, hydrate, or solvate thereof. In another aspect, the food product may comprise about 10 mg to about 150 mg of the compound of Formula (I), or a pharmaceutically or nutraceutically acceptable salt, hydrate, or solvate thereof. In another aspect, the food product may comprise about 10 mg to about 100 mg of the compound of Formula (I), or a pharmaceutically or nutraceutically acceptable salt, hydrate, or solvate thereof. In another aspect, the food product may comprise about 10 mg to about 75 mg of the compound of Formula (I), or a pharmaceutically or nutraceutically acceptable salt, hydrate, or solvate thereof. In another aspect, the food product may comprise about 10 mg to about 50 mg of the compound of Formula (I), or a pharmaceutically or nutraceutically acceptable salt, hydrate, or solvate thereof. In another aspect, the food product may comprise about 20 mg to about 200 mg of the compound of Formula (I), or a pharmaceutically or nutraceutically acceptable salt, hydrate, or solvate thereof. In another aspect, the food product may comprise about 20 mg to about 150 mg of the compound of Formula (I), or a pharmaceutically or nutraceutically acceptable salt, hydrate, or solvate thereof. In another aspect, the food product may comprise about 20 mg to about 100 mg of the compound of Formula (I), or a pharmaceutically or nutraceutically acceptable salt, hydrate, or solvate thereof. In another aspect, the food product may comprise about 20 mg to about 75 mg of the compound of Formula (I), or a pharmaceutically or nutraceutically acceptable salt, hydrate, or solvate thereof. In another aspect, the food product may comprise about 20 mg to about 50 mg of the compound of Formula (I), or a pharmaceutically or nutraceutically acceptable salt, hydrate, or solvate thereof.

In another aspect, the percentage of the amount of the compound of Formula (I), or a pharmaceutically or nutraceutically acceptable salt, hydrate, or solvate thereof, relative to the total amount of caffeine present in the food product ranges from about 1% to about 99%. In another aspect, the percentage of the amount of the compound of Formula (I), or a pharmaceutically or nutraceutically acceptable salt, hydrate, or solvate thereof, relative to the total amount of caffeine present in the food product ranges from about 10% to about 99%. In another aspect, the percentage of the amount of the compound of Formula (I), or a pharmaceutically or nutraceutically acceptable salt, hydrate, or solvate thereof, relative to the total amount of caffeine present in the food product ranges from about 10% to about 90%. In another aspect, the percentage of the amount of the compound of Formula (I), or a pharmaceutically or nutraceutically acceptable salt, hydrate, or solvate thereof, relative to the total amount of caffeine present in the food product ranges from about 10% to about 80%. In another aspect, the percentage of the amount of the compound of Formula (I), or a pharmaceutically or nutraceutically acceptable salt, hydrate, or solvate thereof, relative to the total amount of caffeine present in the food product ranges from about 10% to about 70%. In another aspect, the percentage of the amount of the compound of Formula (I), or a pharmaceutically or nutraceutically acceptable salt, hydrate, or solvate thereof, relative to the total amount of caffeine present in the food product ranges from about 10% to about 60%. In another aspect, the percentage of the amount of the compound of Formula (I), or a pharmaceutically or nutraceutically acceptable salt, hydrate, or solvate thereof, relative to the total amount of caffeine present in the food product ranges from about 10% to about 50%. In another aspect, the percentage of the amount of the compound of Formula (I), or a pharmaceutically or nutraceutically acceptable salt, hydrate, or solvate thereof, relative to the total amount of caffeine present in the food product ranges from about 10% to about 40%. In another aspect, the percentage of the amount of the compound of Formula (I), or a pharmaceutically or nutraceutically acceptable salt, hydrate, or solvate thereof, relative to the total amount of caffeine present in the food product ranges from about 10% to about 25%. In another aspect, the percentage of the amount of the compound of Formula (I), or a pharmaceutically or nutraceutically acceptable salt, hydrate, or solvate thereof, relative to the total amount of caffeine present in the food product ranges from about 25% to about 99%. In another aspect, the percentage of the amount of the compound of Formula (I), or a pharmaceutically or nutraceutically acceptable salt, hydrate, or solvate thereof, relative to the total amount of caffeine present in the food product ranges from about 25% to about 90%. In another aspect, the percentage of the amount of the compound of Formula (I), or a pharmaceutically or nutraceutically acceptable salt, hydrate, or solvate thereof, relative to the total amount of caffeine present in the food product ranges from about 25% to about 80%. In another aspect, the percentage of the amount of the compound of Formula (I), or a pharmaceutically or nutraceutically acceptable salt, hydrate, or solvate thereof, relative to the total amount of caffeine present in the food product ranges from about 25% to about 70%. In another aspect, the percentage of the amount of the compound of Formula (I), or a pharmaceutically or nutraceutically acceptable salt, hydrate, or solvate thereof, relative to the total amount of caffeine present in the food product ranges from about 25% to about 60%. In another aspect, the percentage of the amount of the compound of Formula (I), or a pharmaceutically or nutraceutically acceptable salt, hydrate, or solvate thereof, relative to the total amount of caffeine present in the food product ranges from about 25% to about 50%. In another aspect, the percentage of the amount of the compound of Formula (I), or a pharmaceutically or nutraceutically acceptable salt, hydrate, or solvate thereof, relative to the total amount of caffeine present in the food product ranges from about 25% to about 40%. In another aspect, the percentage of the amount of the compound of Formula (I), or a pharmaceutically or nutraceutically acceptable salt, hydrate, or solvate thereof, relative to the total amount of caffeine present in the food product ranges from about 30% to about 99%. In another aspect, the percentage of the amount of the compound of Formula (I), or a pharmaceutically or nutraceutically acceptable salt, hydrate, or solvate thereof, relative to the total amount of caffeine present in the food product ranges from about 30% to about 90%. In another aspect, the percentage of the amount of the compound of Formula (I), or a pharmaceutically or nutraceutically acceptable salt, hydrate, or solvate thereof, relative to the total amount of caffeine present in the food product ranges from about 30% to about 80%. In another aspect, the percentage of the amount of the compound of Formula (I), or a pharmaceutically or nutraceutically acceptable salt, hydrate, or solvate thereof, relative to the total amount of caffeine present in the food product ranges from about 30% to about 70%. In another aspect, the percentage of the amount of the compound of Formula (I), or a pharmaceutically or nutraceutically acceptable salt, hydrate, or solvate thereof, relative to the total amount of caffeine present in the food product ranges from about 30% to about 60%. In another aspect, the percentage of the amount of the compound of Formula (I), or a pharmaceutically or nutraceutically acceptable salt, hydrate, or solvate thereof, relative to the total amount of caffeine present in the food product ranges from about 30% to about 50%. In another aspect, the percentage of the amount of the compound of Formula (I), or a pharmaceutically or nutraceutically acceptable salt, hydrate, or solvate thereof, relative to the total amount of caffeine present in the food product ranges from about 40% to about 99%. In another aspect, the percentage of the amount of the compound of Formula (I), or a pharmaceutically or nutraceutically acceptable salt, hydrate, or solvate thereof, relative to the total amount of caffeine present in the food product ranges from about 40% to about 90%. In another aspect, the percentage of the amount of the compound of Formula (I), or a pharmaceutically or nutraceutically acceptable salt, hydrate, or solvate thereof, relative to the total amount of caffeine present in the food product ranges from about 40% to about 80%. In another aspect, the percentage of the amount of the compound of Formula (I), or a pharmaceutically or nutraceutically acceptable salt, hydrate, or solvate thereof, relative to the total amount of caffeine present in the food product ranges from about 40% to about 70%. In another aspect, the percentage of the amount of the compound of Formula (I), or a pharmaceutically or nutraceutically acceptable salt, hydrate, or solvate thereof, relative to the total amount of caffeine present in the food product ranges from about 40% to about 60%. In another aspect, the percentage of the amount of the compound of Formula (I), or a pharmaceutically or nutraceutically acceptable salt, hydrate, or solvate thereof, relative to the total amount of caffeine present in the food product ranges from about 40% to about 50%. In another aspect, the percentage of the amount of the compound of Formula (I), or a pharmaceutically or nutraceutically acceptable salt, hydrate, or solvate thereof, relative to the total amount of caffeine present in the food product ranges from about 50% to about 99%. In another aspect, the percentage of the amount of the compound of Formula (I), or a pharmaceutically or nutraceutically acceptable salt, hydrate, or solvate thereof, relative to the total amount of caffeine present in the food product ranges from about 50% to about 90%. In another aspect, the percentage of the amount of the compound of Formula (I), or a pharmaceutically or nutraceutically acceptable salt, hydrate, or solvate thereof, relative to the total amount of caffeine present in the food product ranges from about 50% to about 80%. In another aspect, the percentage of the amount of the compound of Formula (I), or a pharmaceutically or nutraceutically acceptable salt, hydrate, or solvate thereof, relative to the total amount of caffeine present in the food product ranges from about 50% to about 70%. In another aspect, the percentage of the amount of the compound of Formula (I), or a pharmaceutically or nutraceutically acceptable salt, hydrate, or solvate thereof, relative to the total amount of caffeine present in the food product ranges from about 50% to about 60%.

It will be understood that when a range is recited in the application, the end of the range are specifically disclosed as if specifically recited. For example, a range of about 19% to about 99% specifically include a disclosure separately of 19% and separately of 99%.

Also encompassed by the present disclosure are kits (e.g., pharmaceutical or nutraceutical packs). In certain embodiments, the kit comprises a pharmaceutical or nutraceutical composition described herein, and instructions for using the pharmaceutical or nutraceutical composition. In certain embodiments, the kit comprises a first container, wherein the first container includes the pharmaceutical or nutraceutical composition. In some embodiments, the kit further comprises a second container. In certain embodiments, the second container includes an excipient (e.g., an excipient for dilution or suspension of the pharmaceutical or nutraceutical composition). In certain embodiments, the second container includes an additional agent. In some embodiments, the kit further comprises a third container. In certain embodiments, the third container includes an additional agent. In some embodiments, the pharmaceutical or nutraceutical composition included in the first container and the excipient or additional agent(s) included in the second container are combined to form one unit dosage form. In some embodiments, the pharmaceutical or nutraceutical composition included in the first container, the excipient included in the second container, and the additional agent included in the third container are combined to form one unit dosage form. In certain embodiments, each of the first, second, and third containers is independently a vial, ampule, bottle, syringe, dispenser package, tube, sprayer, or inhaler. In certain embodiments, at least one of the first, second, and third containers is a sprayer.

In certain embodiments, the instructions are for administering the pharmaceutical or nutraceutical composition to a subject in need thereof. In certain embodiments, the instructions comprise information required by a regulatory agency, such as the U.S. Food and Drug Administration (FDA) or the European Agency for the Evaluation of Medicinal Products (EMA). In certain embodiments, the instructions comprise prescribing information.

Methods of Use and Uses

The present disclosure also provides methods of using the compounds, compositions, beverages, and food products of the present disclosure. In another aspect, the present disclosure provides methods of delivering to a subject in need thereof a composition (e.g., an effective amount of the composition) (e.g., pharmaceutical composition, nutraceutical composition, cosmetic composition, diet supplement) of the present disclosure.

In another aspect, the present disclosure provides methods of treating a disease in a subject in need thereof comprising administering to the subject in need thereof an effective amount (e.g., therapeutically effective amount) of a compound or composition (e.g., pharmaceutical or nutraceutical composition) of the present disclosure.

In another aspect, the present disclosure provides methods of preventing a disease in a subject in need thereof comprising administering to the subject in need thereof an effective amount (e.g., therapeutically effective amount) of a compound or composition (e.g., pharmaceutical or nutraceutical composition) of the present disclosure.

In another aspect, provided herein are uses of the compounds or compositions of the present disclosure in the manufacture of a medicament for use in a method (e.g., method of delivering an active agent to a subject in need thereof, method of treating a disease in a subject in need thereof, method of preventing a disease in a subject in need thereof) of the present disclosure.

In another aspect, provided herein are uses of the compounds or compositions of the present disclosure in a method (e.g., method of delivering an active agent to a subject in need thereof, method of treating a disease in a subject in need thereof, method of preventing a disease in a subject in need thereof) of the present disclosure.

In certain embodiments, the subject is an animal. The animal may be of either sex and may be at any stage of development. In certain embodiments, the subject described herein is a human. The human may be a child or an adult. In certain embodiments, the subject is a non-human animal. In certain embodiments, the subject is a mammal. In certain embodiments, the subject is a non-human mammal. In certain embodiments, the subject is a domesticated animal, such as a dog, cat, cow, pig, horse, sheep, or goat. In certain embodiments, the subject is a dog. In certain embodiments, the subject is a companion animal, such as a dog or cat. In certain embodiments, the subject is a livestock animal, such as a cow, pig, horse, sheep, or goat. In certain embodiments, the subject is a zoo animal. In another embodiment, the subject is a research animal, such as a rodent (e.g., mouse, rat), dog, pig, or non-human primate. In certain embodiments, the animal is a genetically engineered animal. In certain embodiments, the animal is a transgenic animal (e.g., transgenic mice, transgenic pigs). In certain embodiments, a subject in need thereof is a subject in need of delivery of an active agent or a composition, a subject in need of treatment of a disease, or a subject in need of prevention of a disease.

In certain embodiments, the effective amount is effective in treating the disease. In certain embodiments, the effective amount is effective in preventing the disease.

In certain aspects, the disease is an inflammatory disease. The term "inflammatory disease" refers to a disease caused by, resulting from, or resulting in inflammation. The term "inflammatory disease" may also refer to a dysregulated inflammatory reaction that causes an exaggerated response by macrophages, granulocytes, and/or T-lymphocytes leading to abnormal tissue damage and/or cell death. An inflammatory disease can be either an acute or chronic inflammatory condition and can result from infections or non-infectious causes Inflammatory diseases include atherosclerosis, arteriosclerosis, autoimmune disorders, multiple sclerosis, systemic lupus erythematosus, polymyalgia rheumatica (PMR), gouty arthritis, degenerative arthritis, tendonitis, bursitis, psoriasis, cystic fibrosis, arthrosteitis, rheumatoid arthritis, inflammatory arthritis, Sjogren's syndrome, giant cell arteritis, progressive systemic sclerosis (scleroderma), ankylosing spondylitis, polymyositis, dermatomyositis, pemphigus, pemphigoid, diabetes (e.g., Type I), myasthenia gravis, Hashimoto's thyroiditis, Graves' disease, Goodpasture's disease, mixed connective tissue disease, sclerosing cholangitis, inflammatory bowel disease, Crohn's disease, ulcerative colitis, pernicious anemia, inflammatory dermatoses, usual interstitial pneumonitis (UIP), asbestosis, silicosis, bronchiectasis, berylliosis, talcosis, pneumoconiosis, sarcoidosis, desquamative interstitial pneumonia, lymphoid interstitial pneumonia, giant cell interstitial pneumonia, cellular interstitial pneumonia, extrinsic allergic alveolitis, Wegener's granulomatosis and related forms of angiitis (temporal arteritis and polyarteritis *nodosa*), inflammatory dermatoses, hepatitis, delayed-type hypersensitivity reactions (e.g., poison ivy dermatitis), pneumonia, respiratory tract inflammation, Adult Respiratory Distress Syndrome (ARDS), encephalitis, immediate hypersensitivity reactions, asthma, hayfever, allergies, acute anaphylaxis, rheumatic fever, glomerulonephritis, pyelonephritis, cellulitis, cystitis, chronic cholecystitis, ischemia (ischemic injury), reperfusion injury, allograft rejection, host-versus-graft rejection, appendicitis, arteritis, blepharitis, bronchiolitis, bronchitis, cervicitis, cholangitis, chorioamnionitis, conjunctivitis, dacryoadenitis, dermatomyositis, endocarditis, endometritis, enteritis, enterocolitis, epicondylitis, epididymitis, fasciitis, fibrositis, gastritis, gastroenteritis, gingivitis, ileitis, iritis, laryngitis, myelitis, myocarditis, nephritis, omphalitis, oophoritis, orchitis, osteitis, otitis, pancreatitis, parotitis, pericarditis, pharyngitis, pleuritis, phlebitis, pneumonitis, proctitis, prostatitis, rhinitis, salpingitis, sinusitis, stomatitis, synovitis, testitis, tonsillitis, urethritis, urocystitis, uveitis, vaginitis, vasculitis, vulvitis, vulvovaginitis, angitis, chronic bronchitis, osteomyelitis, optic neuritis, temporal arteritis, transverse myelitis, necrotizing fasciitis, and necrotizing enterocolitis. An ocular inflammatory disease includes post-surgical inflammation.

In certain aspects, the disease is a neurological disease. In certain embodiments, the disease is a neurological disease. The term "neurological disease" refers to any disease of the nervous system, including diseases that involve the central nervous system (brain, brainstem and cerebellum), the peripheral nervous system (including cranial nerves), and the autonomic nervous system (parts of which are located in both central and peripheral nervous system). Neurodegenerative diseases refer to a type of neurological disease marked by the loss of nerve cells, including Alzheimer's disease, Parkinson's disease, amyotrophic lateral sclerosis, tauopathies (including frontotemporal dementia), and Huntington's disease. Examples of neurological diseases include headache, stupor and coma, dementia, seizure, sleep disorders, trauma, infections, neoplasms, neuro-ophthalmology, movement disorders, demyelinating diseases, spinal cord disorders, and disorders of peripheral nerves, muscle and neuromuscular junctions. Addiction and mental illness, include bipolar disorder and schizophrenia, are also included in the definition of neurological diseases. Further examples of neurological diseases include acquired epileptiform aphasia; acute disseminated encephalomyelitis; adrenoleukodystrophy; agenesis of the corpus callosum; agnosia; Aicardi syndrome; Alexander disease; Alpers' disease; alternating hemiplegia; Alzheimer's disease; amyotrophic lateral sclerosis; anencephaly; Angelman syndrome; angiomatosis; anoxia; aphasia; apraxia; arachnoid cysts; arachnoiditis; Arnold-Chiari malformation; arteriovenous malformation; Asperger syndrome; ataxia telangiectasia; attention deficit hyperactivity disorder; autism; autonomic dysfunction; back pain; Batten disease; Behcet's disease; Bell's palsy; benign essential blepharospasm; benign focal; amyotrophy; benign intracranial hypertension; Binswanger's disease; blepharospasm; Bloch Sulzberger syndrome; brachial plexus injury; brain abscess; bbrain injury; brain tumors (including glioblastoma multiforme); spinal tumor; Brown-Sequard syndrome; Canavan disease; carpal tunnel syndrome (CTS); causalgia; central pain syndrome; central pontine myelinolysis; cephalic disorder; cerebral aneurysm; cerebral arteriosclerosis; cerebral atrophy; cerebral gigantism; cerebral palsy; Charcot-Marie-Tooth disease; chemotherapy-induced neuropathy and neuropathic pain; Chiari malformation; chorea; chronic inflammatory demyelinating polyneuropathy (CIDP); chronic pain; chronic regional pain syndrome; Coffin Lowry syndrome; coma, including persistent vegetative state; congenital facial diplegia; corticobasal degeneration; cranial arteritis; craniosynostosis; Creutzfeldt-Jakob disease; cumulative trauma disorders; Cushing's syndrome; cytomegalic inclusion body disease (CIBD); cytomegalovirus infection; dancing eyes-dancing feet syndrome; Dandy-Walker syndrome; Dawson disease; De Morsier's syndrome; Dejerine-Klumpke palsy; dementia; dermatomyositis; diabetic neuropathy; diffuse sclerosis; dysautonomia; dysgraphia; dyslexia; dystonias; early infantile epileptic encephalopathy; empty sella syndrome; encephalitis; encephaloceles; encephalotrigeminal angiomatosis; epilepsy; Erb's palsy; essential tremor; Fabry's disease; Fahr's syndrome; fainting; familial spastic paralysis; febrile seizures; Fisher syndrome; Friedreich's ataxia; frontotemporal dementia and other "tauopathies"; Gaucher's disease; Gerstmann's syndrome; giant cell arteritis; giant cell inclusion disease; globoid cell leukodystrophy; Guillain-Barre syndrome; HTLV-1 associated myelopathy; Hallervorden-Spatz disease; head injury; headache; hemifacial spasm; hereditary spastic paraplegia; heredopathia atactica polyneuritiformis; herpes zoster oticus; herpes zoster; Hirayama syndrome; HIV-associated dementia and neuropathy (see also neurological manifestations of AIDS); holoprosencephaly; Huntington's disease and other polyglutamine repeat diseases; hydranencephaly; hydrocephalus; hypercortisolism; hypoxia; immune-mediated encephalomyelitis; inclusion body myositis; incontinentia pigmenti; infantile; phytanic acid storage disease; Infantile Refsum disease; infantile spasms; inflammatory myopathy; intracranial cyst; intracranial hypertension; Joubert syndrome; Kearns-Sayre syndrome; Kennedy disease; Kinsbourne syndrome; Klippel Feil syndrome; Krabbe disease; Kugelberg-Welander disease; kuru; Lafora disease; Lambert-Eaton myasthenic syndrome; Landau-Kleffner syndrome; lateral medullary (Wallenberg) syndrome; learning disabilities; Leigh's disease; Lennox-Gastaut syndrome; Lesch-Nyhan syndrome; leukodystrophy; Lewy body dementia; lissencephaly; locked-in syndrome; Lou Gehrig's disease (aka motor neuron disease or amyotrophic lateral sclerosis); lumbar disc disease; lyme disease-neurological sequelae; Machado-Joseph disease; macrencephaly; megalencephaly; Melkersson-Rosenthal syndrome; Menieres disease; meningitis; Menkes disease; metachromatic leukodystrophy; microcephaly; migraine; Miller Fisher syndrome; mini-strokes; mitochondrial myopathies; Mobius syndrome; monomelic amyotrophy; motor neurone disease; moyamoya disease; mucopolysaccharidoses; multi-infarct dementia; multifocal motor neuropathy; multiple sclerosis and other demyelinating disorders; multiple system atrophy with postural hypotension; muscular dystrophy; myasthenia gravis; myelinoclastic diffuse sclerosis; myoclonic encephalopathy of infants; myoclonus; myopathy; myotonia congenital; narcolepsy; neurofibromatosis; neuroleptic malignant syndrome; neurological manifestations of AIDS; neurological sequelae of lupus; neuromyotonia; neuronal ceroid lipofuscinosis; neuronal migration disorders; Niemann-Pick disease; O'Sullivan-McLeod syndrome; occipital neuralgia; occult spinal dysraphism sequence; Ohtahara syndrome; olivopontocerebellar atrophy; opsoclonus myoclonus; optic neuritis; orthostatic hypotension; overuse syndrome; paresthesia; Parkinson's disease; paramyotonia congenita; paraneoplastic diseases; paroxysmal attacks; Parry Romberg syndrome; Pelizaeus-Merzbacher disease; periodic paralyses; peripheral neuropathy; painful neuropathy and neuropathic pain; persistent vegetative state; pervasive developmental disorders; photic sneeze reflex; phytanic acid storage disease; Pick's disease; pinched nerve; pituitary tumors; polymyositis; porencephaly; Post-Polio syndrome; postherpetic neuralgia (PHN); postinfectious encephalomyelitis; postural hypotension; Prader-Willi syndrome; primary lateral sclerosis; prion diseases; progressive; hemifacial atrophy; progressive multifocal leukoencephalopathy; progressive sclerosing poliodystrophy; progressive supranuclear palsy; pseudotumor cerebri; Ramsay-Hunt syndrome (Type I and Type II); Rasmussen's Encephalitis; reflex sympathetic dystrophy syndrome; Refsum disease; repetitive motion disorders; repetitive stress injuries; restless legs syndrome; retrovirus-associated myelopathy; Rett syndrome; Reye's syndrome; Saint Vitus Dance; Sandhoff disease; Schilder's disease; schizencephaly; septo-optic dysplasia; shaken baby syndrome; shingles; Shy-Drager syndrome; Sjogren's syndrome; sleep apnea; Soto's syndrome; spasticity; spina bifida; spinal cord injury; spinal cord tumors; spinal muscular atrophy; stiff-person syndrome; stroke; Sturge-Weber syndrome; subacute sclerosing panencephalitis; subarachnoid hemorrhage; subcortical arteriosclerotic encephalopathy; sydenham chorea; syncope; syringomyelia; tardive dyskinesia; Tay-Sachs disease; temporal arteritis; tethered spinal cord syndrome; Thomsen disease; thoracic outlet syndrome; tic douloureux; Todd's paralysis; Tourette syndrome; transient ischemic attack; transmissible spongiform encephalopathies; transverse myelitis; traumatic brain injury; tremor; trigeminal neuralgia; tropical spastic paraparesis; tuberous sclerosis; vascular dementia (multi-infarct dementia); vasculitis including temporal arteritis; Von Hippel-Lindau Disease (VHL); Wallenberg's syndrome; Werdnig-Hoffman disease; West syndrome; whiplash; Williams syndrome; Wilson's disease; and Zellweger syndrome.

In certain embodiments, the disease is a painful condition. A "painful condition" includes neuropathic pain (e.g., peripheral neuropathic pain), central pain, deafferentation pain, chronic pain (e.g., chronic nociceptive pain, and other forms of chronic pain such as post-operative pain, e.g., pain arising after hip, knee, or other replacement surgery), preoperative pain, stimulus of nociceptive receptors (nociceptive pain), acute pain (e.g., phantom and transient acute pain), noninflammatory pain, inflammatory pain, pain associated with cancer, wound pain, burn pain, postoperative pain, pain associated with medical procedures, pain resulting from pruritus, painful bladder syndrome, pain associated with premenstrual dysphoric disorder and/or premenstrual syndrome, pain associated with chronic fatigue syndrome, pain associated with pre-term labor, pain associated with withdrawl symptoms from drug addiction, joint pain, arthritic pain (e.g., pain associated with crystalline arthritis, osteoarthritis, psoriatic arthritis, gouty arthritis, reactive arthritis, rheumatoid arthritis or Reiter's arthritis), lumbosacral pain, musculo-skeletal pain, headache, migraine, muscle ache, lower back pain, neck pain, toothache, dental/maxillofacial pain, visceral pain and the like. One or more of the painful conditions contemplated herein can comprise mixtures of various types of pain provided above and herein (e.g. nociceptive pain, inflammatory pain, neuropathic pain, etc.). In some embodiments, a particular pain can dominate. In other embodiments, the painful condition comprises two or more types of pains without one dominating. A skilled clinician can determine the dosage to achieve a therapeutically effective amount for a particular subject based on the painful condition.

In certain embodiments, the disease is a psychiatric disorder. The term "psychiatric disorder" refers to a disease of the mind and includes diseases and disorders listed in the Diagnostic and Statistical Manual of Mental Disorders—Fourth Edition (DSM-IV), published by the American Psychiatric Association, Washington D. C. (1994). Psychiatric disorders include anxiety disorders (e.g., acute stress disorder agoraphobia, generalized anxiety disorder, obsessive-compulsive disorder, panic disorder, posttraumatic stress disorder, separation anxiety disorder, social phobia, and specific phobia), childhood disorders, (e.g., attention-deficit/hyperactivity disorder, conduct disorder, and oppositional defiant disorder), eating disorders (e.g., anorexia nervosa and bulimia nervosa), mood disorders (e.g., depression, bipolar disorder, cyclothymic disorder, dysthymic disorder, and major depressive disorder), personality disorders (e.g., antisocial personality disorder, avoidant personality disorder, borderline personality disorder, dependent personality disorder, histrionic personality disorder, narcissistic personality disorder, obsessive-compulsive personality disorder, paranoid personality disorder, schizoid personality disorder, and schizotypal personality disorder), psychotic disorders (e.g., brief psychotic disorder, delusional disorder, schizoaffective disorder, schizophreniform disorder, schizophrenia, and shared psychotic disorder), substance-related disorders (e.g., alcohol dependence, amphetamine dependence, *cannabis* dependence, cocaine dependence, hallucinogen dependence, inhalant dependence, nicotine dependence, opioid dependence, phencyclidine dependence, and sedative dependence), adjustment disorder, autism, delirium, dementia, multi-infarct dementia, learning and memory disorders (e.g., amnesia and age-related memory loss), and Tourette's disorder.

In certain embodiments, the disease is a metabolic disorder. The term "metabolic disorder" refers to any disorder that involves an alteration in the normal metabolism of carbohydrates, lipids, proteins, nucleic acids, or a combination thereof. A metabolic disorder is associated with either a deficiency or excess in a metabolic pathway resulting in an imbalance in metabolism of nucleic acids, proteins, lipids, and/or carbohydrates. Factors affecting metabolism include the endocrine (hormonal) control system (e.g., the insulin pathway, the enteroendocrine hormones including GLP-1, PYY or the like), the neural control system (e.g., GLP-1 in the brain), or the like. Examples of metabolic disorders include diabetes (e.g., Type I diabetes, Type II diabetes, gestational diabetes), hyperglycemia, hyperinsulinemia, insulin resistance, and obesity.

In certain embodiments, the disease is a cardiovascular disease. In certain embodiments, the disease is a cardiovascular disease. In certain embodiments, the disease is atherogenesis or atherosclerosis. In certain embodiments, the disease is arterial stent occlusion, heart failure (e.g., congestive heart failure), a coronary arterial disease, myocarditis, pericarditis, a cardiac valvular disease, stenosis, restenosis, in-stent-stenosis, angina pectoris, myocardial infarction, acute coronary syndromes, coronary artery bypass grafting, a cardio-pulmonary bypass procedure, endotoxemia, ischemia-reperfusion injury, cerebrovascular ischemia (stroke), renal reperfusion injury, embolism (e.g., pulmonary, renal, hepatic, gastro-intestinal, or peripheral limb embolism), or myocardial ischemia.

In certain embodiments, the method further comprises administering to the subject in need thereof an additional therapy. In certain embodiments, the additional therapy is an additional pharmaceutical agent. In certain embodiments, the additional therapy is an additional nutraceutical agent. The pharmaceutical and nutraceutical compositions of the present disclosure and the additional therapy may show synergy in the methods and uses of the present disclosure.

In another aspect, the invention is directed to a method for increasing energy levels of a subject, for reducing fatigue or drowsiness in a subject, or for increasing alertness in a subject, the method comprising administering to the subject any composition described herein; or a compound of Formula (I):

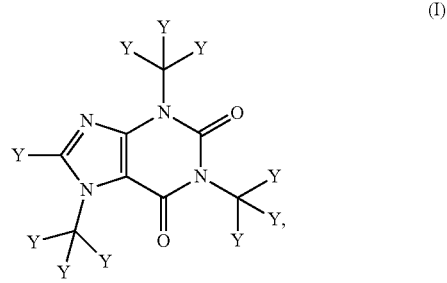

or a pharmaceutically or nutraceutically acceptable salt, hydrate, or solvate thereof;

wherein each Y is independently hydrogen or deuterium; and at least one Y is deuterium.

In another aspect, the invention is directed to a method for treating obesity in a subject, for causing weight loss in a subject, for increasing metabolic rate in a subject, for reducing appetite in a subject, or for increasing energy expenditure in a subject, the method comprising administering to the subject a compound of Formula (I):

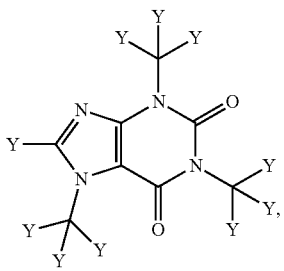

(I)

or a pharmaceutically or nutraceutically acceptable salt, hydrate, or solvate thereof;
wherein each Y is independently hydrogen or deuterium; and
at least one Y is deuterium.

In another aspect, the invention is directed to a method for increasing urine output in a subject, for increasing sodium excretion in a subject, or for reducing edema in a subject, the method comprising administering to the subject a compound of Formula (I):

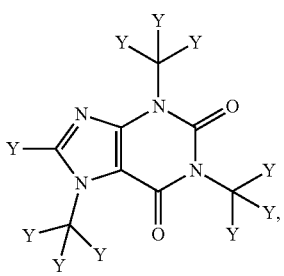

(I)

or a pharmaceutically or nutraceutically acceptable salt, hydrate, or solvate thereof;
wherein each Y is independently hydrogen or deuterium; and
at least one Y is deuterium.

In another aspect, the invention is directed to a method for treating a pain disorder in a subject, the method comprising administering to the subject a compound of Formula (I):

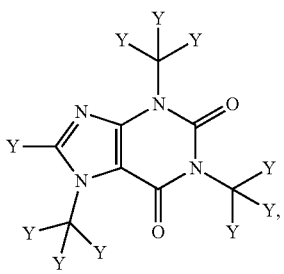

(I)

or a pharmaceutically or nutraceutically acceptable salt, hydrate, or solvate thereof;
wherein each Y is independently hydrogen or deuterium; and
at least one Y is deuterium.

In another aspect, the pain disorder is migraine, arthritis, headache, back pain, bursitis, chronic pain, acute pain, musculoskeletal pain, osteoarthritis, psoriatic arthritis, rheumatoid arthritis, or sciatica. In another aspect, the pain disorder is migraine. In another aspect, the pain disorder is arthritis. In another aspect, the pain disorder is headache. In another aspect, the pain disorder is back pain. In another aspect, the pain disorder is bursitis. In another aspect, the pain disorder is chronic pain. In another aspect, the pain disorder is acute pain. In another aspect, the pain disorder is musculoskeletal pain. In another aspect, the pain disorder is osteoarthritis. In another aspect, the pain disorder is psoriatic arthritis. In another aspect, the pain disorder is rheumatoid arthritis. In another aspect, the pain disorder is sciatica. In another aspect, the pain disorder is migraine or headache.

In another aspect, the invention is directed to a method for treating apnea in a subject, the method comprising administering to the subject a compound of Formula (I):

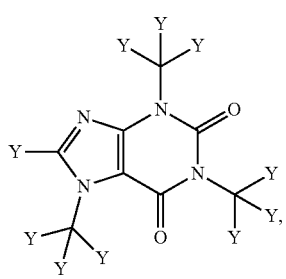

(I)

or a pharmaceutically or nutraceutically acceptable salt, hydrate, or solvate thereof;
wherein each Y is independently hydrogen or deuterium; and
at least one Y is deuterium.

In another aspect, the apnea is sleep apnea. In another aspect, the sleep apnea is obstructive sleep apnea, central sleep apnea, apnea of prematurity, or complex sleep apnea syndrome. In another aspect, the apnea is apnea of prematurity. In another aspect, the subject is a neonate, preterm infant, premature infant, or low birthweight infant. In another aspect, the subject is an adult.

In another aspect, the invention is directed to a method for treating hypotension in a subject, the method comprising administering to the subject a compound of Formula (I):

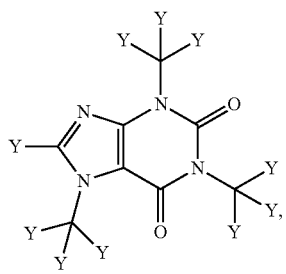

(I)

or a pharmaceutically or nutraceutically acceptable salt, hydrate, or solvate thereof;
wherein each Y is independently hydrogen or deuterium; and
at least one Y is deuterium.

In another aspect, the hypotension is orthostatic hypotension, postprandial hypotension, or multiple system atrophy with orthostatic hypotension. In another aspect, the hypotension is orthostatic hypotension. In another aspect, the hypotension is multiple system atrophy with orthostatic hypotension.

In another aspect, the invention is directed to a method for treating an encephalopathy in a subject, the method comprising administering to the subject a compound of Formula (I):

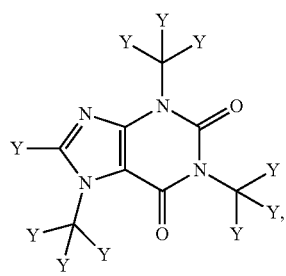

or a pharmaceutically or nutraceutically acceptable salt, hydrate, or solvate thereof;
wherein each Y is independently hydrogen or deuterium; and
at least one Y is deuterium.

In another aspect, the encephalopathy is chronic traumatic encephalopathy, glycine encephalopathy, Hashimoto's encephalopathy, hepatic encephalopathy, hypertensive encephalopathy, hypoxic ischemic encephalopathy, toxic metabolic encephalopathy, infectious encephalopathy, uremic encephalopathy, or Wernicke encephalopathy. In another aspect, the encephalopathy is chronic traumatic encephalopathy. In another aspect, the encephalopathy is glycine encephalopathy. In another aspect, the encephalopathy is Hashimoto's encephalopathy. In another aspect, the encephalopathy is hepatic encephalopathy. In another aspect, the encephalopathy is hypertensive encephalopathy. In another aspect, the encephalopathy is hypoxic ischemic encephalopathy. In another aspect, the encephalopathy is toxic metabolic encephalopathy. In another aspect, the encephalopathy is infectious encephalopathy. In another aspect, the encephalopathy is uremic encephalopathy. In another aspect, the encephalopathy is Wernicke encephalopathy.

In another aspect, the invention is directed to a method for treating a neurological or psychiatric disorder in a subject, the method comprising administering to the subject a compound of Formula (I):

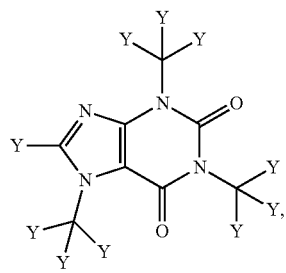

or a pharmaceutically or nutraceutically acceptable salt, hydrate, or solvate thereof;
wherein each Y is independently hydrogen or deuterium; and
at least one Y is deuterium.

In another aspect, the neurological or psychiatric disorder is narcolepsy, Alzheimer's disease, attention deficit hyperactivity disorder (ADHD), schizophrenia, Parkinson's disease, or depression. In another aspect, the neurological or psychiatric disorder is narcolepsy. In another aspect, the neurological or psychiatric disorder is Alzheimer's disease. In another aspect, the neurological or psychiatric disorder is attention deficit hyperactivity disorder (ADHD. In another aspect, the neurological or psychiatric disorder is schizophrenia. In another aspect, the neurological or psychiatric disorder is Parkinson's disease. In another aspect, the neurological or psychiatric disorder depression.

In another aspect, the invention is directed to a method for treating an inflammatory disorder in a subject, the method comprising administering to the subject a compound of Formula (I):

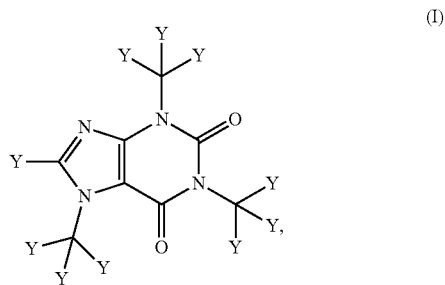

or a pharmaceutically or nutraceutically acceptable salt, hydrate, or solvate thereof;
wherein each Y is independently hydrogen or deuterium; and
at least one Y is deuterium.

In another aspect, the inflammatory disorder is a pulmonary inflammatory disorder. In another aspect, the inflammatory disorder is asthma, chronic obstructive pulmonary disorder (COPD), pulmonary fibrosis, or interstitial lung disease. In another aspect, the inflammatory disorder is asthma. In another aspect, the inflammatory disorder is chronic obstructive pulmonary disorder (COPD). In another aspect, the inflammatory disorder is pulmonary fibrosis. In another aspect, the inflammatory disorder is interstitial lung disease.

In any of the methods described herein, the maximum plasma concentration ($C_{max}$) of the compound of Formula (I) after administration of the compound of Formula (I), or a pharmaceutically or nutraceutically acceptable salt, hydrate, or solvate, thereof, is substantially similar to that of non-isotopically enriched caffeine at an equivalent dose.

In another aspect, the maximum plasma concentration ($C_{max}$) of the compound of Formula (I) after administration of the compound of Formula (I), or a pharmaceutically or nutraceutically acceptable salt, hydrate, or solvate thereof, is lower than that of non-isotopically enriched caffeine at an equivalent dose. In another aspect, the maximum plasma concentration ($C_{max}$) of the compound of Formula (I) after administration of the compound of Formula (I), or a pharmaceutically or nutraceutically acceptable salt, hydrate, or solvate thereof, is at least 5%, 10%, 25%, or 50% lower than of non-isotopically enriched caffeine at an equivalent dose.

In any of the methods described herein, the time of maximum plasma concentration ($T_{max}$) of the compound of Formula (I) after administration of the compound of Formula (I), or a pharmaceutically or nutraceutically acceptable salt, hydrate, or solvate thereof, is longer than that of non-isotopically enriched caffeine at an equivalent dose.

In another aspect, the time of maximum plasma concentration ($T_{max}$) of the compound of Formula (I) after administration of the compound of Formula (I), or a pharmaceutically or nutraceutically acceptable salt, hydrate, or solvate thereof, is at least 5%, 10%, 25%, 50%, 100%, 200%, 300%, or 400% longer than that of non-isotopically enriched caffeine at an equivalent dose.

In another aspect, the plasma half-life ($t_{1/2}$) of the compound of Formula (I) after administration of the compound of Formula (I), or a pharmaceutically or nutraceutically acceptable salt, hydrate, or solvate thereof, is longer than that of non-isotopically enriched caffeine at an equivalent dose.

In any of the methods described herein, the plasma half-life ($t_{1/2}$) of the compound of Formula (I) after administration of the compound of Formula (I), or a pharmaceutically or nutraceutically acceptable salt, hydrate, or solvate thereof, is at least 5%, 10%, 25%, 50%, 100%, 200%, 300%, or 400% longer than that of non-isotopically enriched caffeine at an equivalent dose.

In any of the methods described herein, the maximum concentration ($C_{max}$) of the compound of Formula (I) in the central nervous system (CNS) of the subject after administration of the compound of Formula (I), or a pharmaceutically or nutraceutically acceptable salt, hydrate, or solvate thereof, is substantially similar to that of non-isotopically enriched caffeine at an equivalent dose.

In another aspect, the maximum concentration ($C_{max}$) of the compound of Formula (I) in the central nervous system (CNS) of the subject after administration of the compound of Formula (I), or a pharmaceutically or nutraceutically acceptable salt, hydrate, or solvate thereof, is at least 5%, 10%, 25%, or 50% lower than that of non-isotopically enriched caffeine at an equivalent dose.

In any of the methods described herein, the time of maximum concentration ($T_{max}$) of the compound of Formula (I) in the central nervous system (CNS) of the subject after administration of the compound of Formula (I), or a pharmaceutically or nutraceutically acceptable salt, hydrate, or solvate thereof, is longer than that of non-isotopically enriched caffeine at an equivalent dose.

In another aspect, the time of maximum concentration ($T_{max}$) of the compound of Formula (I) in the central nervous system (CNS) of the subject after administration of the compound of Formula (I), or a pharmaceutically or nutraceutically acceptable salt, hydrate, or solvate thereof, is at least 5%, 10%, 25%, 50%, 100%, 200%, 300%, or 400% longer than that of non-isotopically enriched caffeine at an equivalent dose.

In any of the methods described herein, the total systemic exposure (AUC) in plasma of the compound of Formula (I) after administration of the compound of Formula (I), or a pharmaceutically or nutraceutically acceptable salt, hydrate, or solvate thereof, is at least 5%, 10%, 25%, 50%, 100%, or 200% greater than that of non-isotopically enriched caffeine at an equivalent dose.

In another aspect, the total systemic exposure (AUC) in plasma of the compound of Formula (I) after administration of the compound of Formula (I), or a pharmaceutically or nutraceutically acceptable salt, hydrate, or solvate thereof, is greater than that of non-isotopically enriched caffeine at an equivalent dose.

In any of the methods described herein, the total systemic exposure (AUC) in the central nervous system of the compound of Formula (I) after administration of the compound of Formula (I), or a pharmaceutically or nutraceutically acceptable salt, hydrate, or solvate thereof, is at least 5%, 10%, 25%, 50%, 100%, or 200% greater than that of non-isotopically enriched caffeine at an equivalent dose.

In another aspect, the total systemic exposure (AUC) in the central nervous system of the compound of Formula (I) after administration of the compound of Formula (I), or a pharmaceutically or nutraceutically acceptable salt, hydrate, or solvate thereof, is greater than that of non-isotopically enriched caffeine at an equivalent dose.

In any of the methods described herein, the ratio of the total systemic exposure (AUC) in plasma of the compound of Formula (I) after administration of the compound of Formula (I), or a pharmaceutically or nutraceutically acceptable salt, hydrate, or solvate thereof, to the total systemic exposure (AUC) in the central nervous system of the compound, is substantially similar to that of non-isotopically enriched caffeine at an equivalent dose.

In another aspect, the ratio of the total systemic exposure (AUC) in plasma of the compound of Formula (I) after administration of the compound of Formula (I), or a pharmaceutically or nutraceutically acceptable salt, hydrate, or solvate thereof, to the total systemic exposure (AUC) in the central nervous system of the compound, is within 20%, 15%, 10%, 5%, 2%, or 1% of that of non-isotopically enriched caffeine at an equivalent dose.

In another aspect, the side effects experienced after administration of a compound of Formula (I), or a pharmaceutically or nutraceutically acceptable salt, hydrate, solvate, composition, or prodrug thereof, are reduced relative to the administration of non-isotopically enriched caffeine at an equivalent dose. In another aspect, the side effect is anxiety, insomnia, gastrointestinal issues (e.g., loose stools, diarrhea, stomach ulcers, gastroesophageal reflux, etc.), rhabdomyolysis, addiction, hypertension, rapid heart rate, atrial fibrillation, fatigue, irritability, nervousness, restlessness, nausea, or muscle tremors.

In any of the methods described herein, the side effects are reduced relative to the administration of non-isotopically enriched caffeine at an equivalent dose. In another aspect, the side effect is anxiety, insomnia, gastrointestinal issues (e.g., loose stools, diarrhea, stomach ulcers, gastroesophageal reflux, etc.), rhabdomyolysis, addiction, hypertension, rapid heart rate, atrial fibrillation, fatigue, irritability, nervousness, restlessness, nausea, or muscle tremors.

The representative examples, which follow, are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. It should further be appreciated that, unless otherwise indicated, the entire contents of each of the references cited herein are incorporated herein by reference to help illustrate the state of the art. The following examples contain important additional information, exemplification and guidance, which can be adapted to the practice of this invention in its various embodiments and the equivalents thereof.

These and other aspects of the present invention will be further appreciated upon consideration of the following Examples, which are intended to illustrate certain particular embodiments of the invention but are not intended to limit its scope, as defined by the claims.

EXAMPLES

In order that the disclosure described herein may be more fully understood, the following examples are set forth. The synthetic and biological examples described in this application are offered to illustrate the compounds, compositions, food products, beverages, and methods provided herein and are not to be construed in any way as limiting their scope.

| Abbreviations | |
|---|---|
| $AUC_{inf}$ | Area under the concentration-time curve from time zero extrapolated to infinity |
| $AUC_{last}$ | Area under the concentration-time curve from time zero to the last quantifiable concentration |
| BQL | Below quantitation limit |
| $C_{max}$ | Maximum concentration observed |
| CV | Coefficient of variation |
| Hr | Hour(s) |
| LC-MS/MS | Liquid Chromatography Tandem Mass Spectrometry |
| LLOQ | Lower limit of quantitation |
| Min | Minute(s) |
| n | Number of samples |
| NA | Not applicable |
| No. | Number |
| NR | Not reported |
| QC | Quality control |
| rpm | Revolutions per minute |
| SD | Standard deviation |
| Sec | Second(s) |
| Std | Standard |
| $T_{1/2}$ | Terminal half-life |
| $T_{max}$ | Time of observed maximum concentration |
| ULOQ | Upper limit of quantitation |
| v | Volume |

Compounds

Compounds delineated herein include salt, hydrate and solvates thereof. They include all compounds delineated in schemes herein, whether intermediate or final compounds in a process.

Compounds of the invention can be obtained from natural sources or made or modified made by means known in the art of organic synthesis. Methods for optimizing reaction conditions, if necessary minimizing competing by-products, are known in the art. Reaction optimization and scale-up may advantageously utilize high-speed parallel synthesis equipment and computer-controlled microreactors (e.g. *Design And Optimization in Organic Synthesis*, $2^{nd}$ Edition, Carlson R, Ed, 2005; Elsevier Science Ltd.; Jähnisch, K et al, Angew. Chem. Int. Ed. Engl. 2004 43: 406; and references therein). Additional reaction schemes and protocols may be determined by the skilled artesian by use of commercially available structure-searchable database software, for instance, SciFinder® (CAS division of the American Chemical Society) and CrossFire Beilstein® (Elsevier MDL), or by appropriate keyword searching using an internet search engine such as Google® or keyword databases such as the US Patent and Trademark Office text database.

Caffeine and D9-caffeine (Compound 14) were purchased from the Sigma-Aldrich and stored at room temperature upon receipt.

Pharmacokinetic (PK) Study Design

Two groups of fasted male Sprague-Dawley rats (12 animals per group) were administered an oral single dose of caffeine in deionized water (Group 1) or D9-caffeine in deionized water (Group 2) at a target dose level of 2 mg/kg.

Serial blood samples were collected from three animals per group per timepoint prior to dosing and at 0.25, 0.5, 1, 2, 3 4, 6, 8, 10, 12, and 14-hours post dose. No more than three blood samples were collected from individual animals with the last sample being a terminal blood draw. Terminal brain samples were collected from three animals per group at 1, 4, 8, and 14-hours post dose. Blood samples were collected into tubes containing sodium heparin, and then processed for plasma and stored frozen until bioanalysis. Brain samples were collected following the terminal blood collection, rinsed with saline, and stored frozen until bio-analysis.

Plasma and brain samples were analyzed for caffeine and D9-caffeine (Compound 14) concentration using a liquid chromatography-tandem mass spectrometry (LC-MS/MS) method. Non-compartmental pharmacokinetic parameter estimates were calculated from the mean plasma concentration-time data.

The results demonstrate that D9-caffeine (Compound 14) provides a higher systemic exposure (as measured by AUC) and a longer half-life than a corresponding dose of caffeine in vivo.

Extraction Procedure, LC and MS Conditions, and Data Analysis

Table 1 captures the extraction procedures, liquid chromatography (LC) and mass spectrometry (MS) conditions, and the data analysis methods employed.

TABLE 1

| | |
|---|---|
| Sample Extraction | Aliquot 10 µL of sample (calibration standards, quality control samples, blanks and study samples) into a 96-well plate |
| | Add 60 µL of internal standard spiking solution (100 ng/mL $^{13}C_3$-Caffeine in acetonitrile) to each well, except for double blanks to which 60 µL of acetonitrile was added per well |
| | Vortex-mix |
| | Centrifuge at >3000 rpm for 5 minutes |
| | Transfer supernatant (50 µL) into a clean 96-well plate containing 50 µL of water per well |
| | Vortex-mix |
| LC Conditions | |
| Column | Waters Atlantis T3; 3 um, 30 × 2.1 mm |
| Temperature | 45° C. |
| Mobile Phase A | 0.1% formic acid in 95:5 (v:v) water: acetonitrile |
| Mobile Phase B | 0.1% formic acid in 50:50 (v:v) acetonitrile: methanol |

| Gradient | Time (sec) | % Mobile Phase B | Flow (mL/min) |
|---|---|---|---|
| | 15 | 5 | 0.500 |
| | 60 | 95 | 0.500 |
| | 5 | 95 | 0.500 |
| | 30 | 95 | 0.500 |
| | 40 | 5 | 0.500 |

| | |
|---|---|
| MS Conditions | |
| MS/MS Ionization Method | API-5500 Electrospray, positive ion |
| Resolution | Unit/Unit |
| Source Temperature | 550° C. |
| Transitions (m/z) | |
| Caffeine: | 195.1/138.1 |
| D9-Caffeine: | 204.1/144.1 |
| $^{13}C_3$- | |

TABLE 1-continued

| | |
|---|---|
| Caffeine (IS): | 198.1/140.1 |
| Data Analysis | |
| Acquisition and Processing | Analyst ® (Applied Biosystems Sciex) |
| Regression Type | Linear, $1/x^2$ |
| Acceptance Criteria | |
| Calibration Standards | At least 75% of the total number of calibration standards are within ±15.0% of their nominal concentrations (±20.0% at LLOQ). At least one calibration standard at the LLOQ and at the ULOQ must be acceptable. Accuracy (bias) of the mean values are within ±15.0% from nominal concentration (±20.0% at LLOQ), and precision (CV) is ≤15.0% (≤20.0% at LLOQ) |
| Quality Controls | At least two-thirds of replicates are within ±15.0% of their nominal concentrations (±20.0% at LLOQ). Accuracy (bias) of the mean values are within ±15.0% from nominal concentration (±20.0% at LLOQ), and precision (CV) is ≤15.0% (≤20.0% at LLOQ) |

Preparation of Dose Formulations

Dose formulations were prepared on the day of dosing.

For Group 1, the dosing formulation was prepared at a target concentration of 0.2 mg/mL by adding caffeine (10.00 mg) to deionized water (49.778 g), vortex-mixing and sonicating.

For Group 2, the dosing formulation was prepared at a target concentration of 0.2 mg/mL by adding D9-caffeine (10.04 mg) to deionized water (49.792 g), vortex-mixing and sonicating.

After dosing, the formulations were stored in a −80° C. freezer.

Rat Acclimation and Housing

Male Sprague-Dawley rats were received from Envigo RMS on 18 Mar. 2019. After an acclimation period of three days, 24 males were assigned to the study based on acceptable health. Animals assigned to the study were uniquely identified by tail marking (indelible ink) and cage cards.

Animals were housed in Innovive® disposable micro-isolator cages (1 to 3 animals per cage). Teklad Global Diets™ (Envigo) 18% Protein Rodent Diet 2018 and tap water were provided ad libitum until the evening prior to dosing. Animals were fasted overnight prior to dose administration.

Animal quarters were maintained at a temperature between 20° C. to 26° C. (68° F. to 79° F.), a relative humidity of 30% to 70%, and with an air flow of at least 10 changes per hour. The light/dark cycle was set for 12-hour intervals, but the cycle was interrupted for the performance of study procedures.

After collection of the final blood samples, the study animals were euthanized by carbon dioxide asphyxiation in accordance with the American Veterinary Medical Association Guidelines on Euthanasia (current version).

Dose Administration

Animals were fasted overnight prior to dose administration. Water was provided ad libitum. Food was returned after the collection of the 4-hour samples. Two groups of male Sprague-Dawley rats (12 animals per group) were administered a single dose of caffeine in deionized water (Group 1) or D9-caffeine (Compound 14) in deionized water (Group 2) at a target dose level of 2 mg/kg.

Prior to dosing, the body weight of each animal was recorded. Doses (rounded to the nearest 0.001 mL) were calculated based on the pretreatment body weight (kg) and a dose volume of 10 mL/kg. Oral doses were administered using a ball tipped feeding needle. Dosing syringes were weighed immediately prior to and immediately after dosing each animal, and the quantity of formulation administered to each animal was determined from the difference in syringe weights.

Sample Collection and Processing

Serial blood samples (~300 µL) were collected from three animals per group per timepoint into tubes containing sodium heparin prior to dosing and at 0.25, 0.5, 1, 2, 3, 4, 6, 8, 10, 12, and 14-hours post dose. Blood was collected from each animal on three occasions with the last blood draw coinciding with the sacrifice of the animal. Blood samples were stored on wet ice until being processed for plasma via centrifugation (3500 g for 10 minutes at 5° C.) within 30 minutes of collection. Plasma samples were transferred into matrix tubes and stored in a freezer set to maintain a temperature of −80° C. until analysis.

Immediately after the 1, 4, 8 and 14-hour blood collections, three animals/group were euthanized and the brain was dissected out of each rat. The brains were rinsed with saline and dried, placed in pre-weighed conical tubes, and flash frozen in liquid nitrogen. Brain weights were calculated for each sample. Brains were stored in a freezer set to maintain a temperature of −80° C.

Bioanalysis

Rat plasma and brain samples were analyzed for concentrations of caffeine and D9-caffeine (Compound 14) using a qualified LC-MS/MS method. The extraction procedure and analytical method are detailed in Table 1.

Pharmacokinetic Analysis

Pharmacokinetic parameter estimates were calculated from the caffeine and D9-caffeine (Compound 14) plasma concentration-time data generated from combined animal plasma data using nominal sampling times and non-compartmental methods. The concentration-time data were analyzed to fit an extra-vascular (oral gavage) dosing plasma analysis model (200) using the software WinNonlin Phoenix version 6.3 (Pharsight). The pharmacokinetic parameters assessed include, as appropriate: $T_{1/2}$ (terminal half-life); $T_{max}$ (time of peak concentration); $C_{max}$ (peak or maximum concentration); $AUC_{last}$ (computed from time zero to the time of the last positive Y value), and $AUC_{INF}$ (area under a concentration of analyte vs. time calculated using zero to infinity).

Areas-under-the-plasma concentration-time curves (AUC) were estimated using the linear trapezoidal rule. The area through the time ($T_{last}$) of the last observable concentration ($C_{last}$) is reported as $AUC_{last}$. AUC extrapolated to infinity, ($AUC_{INF}$) was estimated by adding $AUC_{last}$ and the ratio of $C_{last}/\lambda_z$, where $\lambda_z$ is the terminal rate constant. Apparent $T_{1/2}$ was calculated using the slope of the log-linear terminal phase of the concentration-time curve, defined by a minimum of three plasma concentration-time points. Half-lives are reported if the correlation for the regression line, as measured by r squared, is ≥0.9, when rounded.

Results

Dose Administration

Two groups of male Sprague-Dawley rats (12 animals per group) were administered a single dose of caffeine in deionized water (Group 1) or D9-caffeine in deionized water (Group 2) at a target dose level of 2 mg/kg.

In rats treated with caffeine (Group 1), the dose administered, determined gravimetrically and based on nominal concentration, ranged from 1.970 to 2.023 mg/kg (−1.48% to 1.21% dosing variance). In rats treated with D9-caffeine (Group 2), the dose administered, determined gravimetrically and based on nominal concentration, ranged from 1.971 to 2.017 mg/kg (−1.43% to 0.85% dosing variance). Dose administration data are reported in Table 2.

TABLE 2

| Group Number | Test Article | Animal Number | Animal Weight (kg) | Formulation Administered (g) | Nominal Concentration[a] (mg/mL) | Dose Administered (mg) | Dose Administered (mg/kg) | Protocol-Specified Dose (mg/kg) | Dosing Variance (%) |
|---|---|---|---|---|---|---|---|---|---|
| 1 | Caffeine | 1 | 0.339 | 3.388 | 0.2 | 0.678 | 1.999 | 2 | −0.06 |
| | | 2 | 0.333 | 3.331 | 0.2 | 0.666 | 2.001 | 2 | 0.03 |
| | | 3 | 0.338 | 3.338 | 0.2 | 0.668 | 1.975 | 2 | −1.24 |
| | | 4 | 0.380 | 3.771 | 0.2 | 0.754 | 1.985 | 2 | −0.76 |
| | | 5 | 0.341 | 3.450 | 0.2 | 0.690 | 2.023 | 2 | 1.17 |
| | | 6 | 0.328 | 3.305 | 0.2 | 0.661 | 2.015 | 2 | 0.76 |
| | | 7 | 0.351 | 3.527 | 0.2 | 0.705 | 2.010 | 2 | 0.48 |
| | | 8 | 0.348 | 3.522 | 0.2 | 0.704 | 2.024 | 2 | 1.21 |
| | | 9 | 0.331 | 3.334 | 0.2 | 0.667 | 2.015 | 2 | 0.73 |
| | | 10 | 0.332 | 3.324 | 0.2 | 0.665 | 2.002 | 2 | 0.12 |
| | | 11 | 0.332 | 3.346 | 0.2 | 0.669 | 2.016 | 2 | 0.78 |
| | | 12 | 0.317 | 3.123 | 0.2 | 0.625 | 1.970 | 2 | −1.48 |
| 2 | D9-Caffeine | 13 | 0.345 | 3.476 | 0.2 | 0.695 | 2.015 | 2 | 0.75 |
| | | 14 | 0.346 | 3.479 | 0.2 | 0.696 | 2.011 | 2 | 0.55 |
| | | 15 | 0.341 | 3.439 | 0.2 | 0.688 | 2.017 | 2 | 0.85 |
| | | 16 | 0.343 | 3.455 | 0.2 | 0.691 | 2.015 | 2 | 0.73 |
| | | 17 | 0.345 | 3.473 | 0.2 | 0.695 | 2.013 | 2 | 0.67 |
| | | 18 | 0.360 | 3.592 | 0.2 | 0.718 | 1.996 | 2 | −0.22 |
| | | 19 | 0.378 | 3.726 | 0.2 | 0.745 | 1.971 | 2 | −1.43 |
| | | 20 | 0.330 | 3.304 | 0.2 | 0.661 | 2.002 | 2 | 0.12 |
| | | 21 | 0.361 | 3.628 | 0.2 | 0.726 | 2.010 | 2 | 0.50 |
| | | 22 | 0.326 | 3.258 | 0.2 | 0.652 | 1.999 | 2 | −0.06 |
| | | 23 | 0.351 | 3.500 | 0.2 | 0.700 | 1.994 | 2 | −0.28 |
| | | 24 | 0.370 | 3.680 | 0.2 | 0.736 | 1.989 | 2 | −0.54 |

[a]Assumes a density of 1.0 g/mL.

Sample Collection and Processing

Samples were obtained within 5% of the scheduled time with the following exceptions: the 0.5-hour blood sample from Animal No. 1 (11.61%) and the 1-hour brain samples from Animal No. 1 (8.19%), No. 2 (7.47%), No. 3 (7.06%), No. 4 (7.39%), No. 5 (8.00%), and No. 6 (6.72%).

Concentrations in Plasma

Mean caffeine concentrations in plasma following an oral (gavage) dose of caffeine to male Sprague-Dawley rats are summarized in Table 3 and data for individual animals are reported in Table 4. Mean D9-caffeine (Compound 14) concentrations in plasma following an oral (gavage) dose of D9-caffeine (Compound 14) to male Sprague-Dawley rats are summarized in Table 5. Data for individual animals are reported in Table 6. Mean caffeine and D9-caffeine plasma concentration-time profiles are plotted in FIG. 1.

Following administration of 2 mg/kg of caffeine or D9-caffeine (Compound 14), measurable plasma concentrations of caffeine or D9-caffeine (Compound 14) were detected in all animals evaluated at each time point through 14 hours post dose.

TABLE 3

Group 1: Mean (n = 3/time point) Caffeine Concentrations in Plasma Following an Oral (Gavage) Dose of Caffeine to Fasted Male Sprague-Dawley Rats at a Target Dose Level of 2 mg/kg

| Time (hour) | Concentration (ng/mL) | | |
|---|---|---|---|
| | Mean | SD | % CV |
| Pre | BQL | NA | NA |
| 0.25 | 2423 | 219 | 9.1 |
| 0.5 | 2407 | 92.4 | 3.8 |
| 1 | 2643 | 123 | 4.7 |
| 2 | 2067 | 32.1 | 1.6 |
| 3 | 2030 | 65.6 | 3.2 |
| 4 | 1820 | 121 | 6.7 |
| 6 | 1199 | 341 | 28.4 |
| 8 | 849 | 340 | 40.1 |
| 10 | 344 | 118 | 34.3 |
| 12 | 171 | 74.4 | 43.5 |
| 14 | 97.1 | 51.9 | 53.4 |

TABLE 4

Group 1: Caffeine Concentrations in Plasma Following an Oral (Gavage) Dose of Caffeine to Fasted Male Sprague Dawley Rats at a Target Dose Level of 2 mg/kg

| Time Point (hr) | Concentration (ng/mL) Animal No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Pre | BQL | BQL | BQL | BQL | BQL | BQL | BQL | BQL | BQL | BQL | BQL | BQL |
| 0.25 | 2250 | 2670 | 2350 | — | — | — | — | — | — | — | — | — |
| 0.5 | 2460 | 2300 | 2460 | — | — | — | — | — | — | — | — | — |
| 1 | 2540 | 2610 | 2780 | — | — | — | — | — | — | — | — | — |
| 2 | — | — | — | 2080 | 2030 | 2090 | — | — | — | — | — | — |
| 3 | — | — | — | 2100 | 1970 | 2020 | — | — | — | — | — | — |

TABLE 4-continued

Group 1: Caffeine Concentrations in Plasma Following an Oral (Gavage) Dose of Caffeine to Fasted Male Sprague Dawley Rats at a Target Dose Level of 2 mg/kg

| Time Point (hr) | Concentration (ng/mL) Animal No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 4 | — | — | — | 1710 | 1800 | 1950 | — | — | — | — | — | — |
| 6 | — | — | — | 1470 | 1310 | 816 | — | — | — | — | — | — |
| 8 | — | — | — | — | — | — | 1150 | 916 | 480 | — | — | — |
| 10 | — | — | — | — | — | — | — | — | — | 439 | 382 | 212 |
| 12 | — | — | — | — | — | — | — | — | — | 231 | 194 | 87.7 |
| 14 | — | — | — | — | — | — | — | — | — | 136 | 117 | 38.2 |

— Not a scheduled time point.
BQL: Below quantitation limit (<3.00 ng/mL)

TABLE 5

Group 2: Mean (n = 3/time point) D9-Caffeine Concentrations in Plasma Following an Oral (Gavage) Dose of D9-Caffeine to Fasted Male Sprague-Dawley Rats at a Target Dose Level of 2 mg/kg

| Time (hour) | Concentration (ng/mL) | | |
|---|---|---|---|
| | Mean | SD | % CV |
| Pre | BQL | NA | NA |
| 0.25 | 1717 | 230 | 13.4 |
| 0.5 | 1743 | 261 | 15.0 |
| 1 | 2093 | 145 | 6.9 |
| 2 | 2340 | 72.1 | 3.1 |
| 3 | 2357 | 73.7 | 3.1 |
| 4 | 2267 | 76.4 | 3.4 |
| 6 | 1793 | 55.1 | 3.1 |
| 8 | 1550 | 108 | 7.0 |
| 10 | 1210 | 78.1 | 6.5 |
| 12 | 897 | 70.0 | 7.8 |
| 14 | 682 | 76.4 | 11.2 |

TABLE 6

Group 2: D9-Caffeine Concentrations in Plasma Following an Oral (Gavage) Dose of D9-Caffeine to Fasted Male Sprague Dawley Rats at a Target Dose Level of 2 mg/kg

| Time Point (hour) | Concentration (ng/mL) Animal No. | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Pre | BQL | BQL | BQL | BQL | BQL | BQL | BQL | BQL | BQL | BQL | BQL | BQL |
| 0.25 | 1730 | 1480 | 1940 | — | — | — | — | — | — | — | — | — |
| 0.5 | 1680 | 1520 | 2030 | — | — | — | — | — | — | — | — | — |
| 1 | 2020 | 2000 | 2260 | — | — | — | — | — | — | — | — | — |
| 2 | — | — | — | 2400 | 2360 | 2260 | — | — | — | — | — | — |
| 3 | — | — | — | 2330 | 2440 | 2300 | — | — | — | — | — | — |
| 4 | — | — | — | 2350 | 2250 | 2200 | — | — | — | — | — | — |
| 6 | — | — | — | — | — | — | 1850 | 1740 | 1790 | — | — | — |
| 8 | — | — | — | — | — | — | 1670 | 1460 | 1520 | — | — | — |
| 10 | — | — | — | — | — | — | — | — | — | 1160 | 1170 | 1300 |
| 12 | — | — | — | — | — | — | — | — | — | 910 | 821 | 959 |
| 14 | — | — | — | — | — | — | — | — | — | 633 | 643 | 770 |

— Not a scheduled time point.
BQL: Below quantitation limit (<3.00 ng/mL)

Concentrations in Brain

Mean caffeine concentrations in brain following an oral (gavage) dose of caffeine to male Sprague-Dawley rats are summarized in Table 7. Data for individual animals are reported in Table 8. Mean D9-caffeine (Compound 14) concentrations in brain following an oral (gavage) dose of D9-caffeine (Compound 14) to male Sprague-Dawley rats are summarized in Table 9. Data for individual animals are reported in Table 10. Mean caffeine and D9-caffeine (Compound 14) brain concentration-time profiles are shown in FIG. 2.

Following administration of 2 mg/kg of caffeine or D9-caffeine (Compound 14), measurable brain concentrations of caffeine or D9-caffeine (Compound 14) were detected in all animals evaluated at each time point through 14 hours post dose.

TABLE 7

Group 1: Mean (n = 3/time point) Caffeine Concentrations in Brain Following an Oral (Gavage) Dose of Caffeine to Fasted Male Sprague-Dawley Rats at a Target Dose Level of 2 mg/kg

| Time (hour) | Concentration (ng/g) | | |
|---|---|---|---|
| | Mean | SD | % CV |
| 1 | 1910 | 118 | 6.2 |
| 4 | 1210 | 75 | 6.2 |
| 8 | 553 | 245 | 44.3 |
| 14 | 62.6 | 33.7 | 53.8 |

TABLE 8

Group 1: Caffeine Concentrations in Brain Following an Oral (Gavage) Dose of Caffeine to Fasted Male Sprague Dawley Rats at a Target Dose Level of 2 mg/kg

| Time Point (hour) | Concentration (ng/g) Animal No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1 | 2010 | 1940 | 1780 | — | — | — | — | — | — | — | — | — |
| 4 | — | — | — | 1140 | 1200 | 1290 | — | — | — | — | — | — |
| 8 | — | — | — | — | — | — | 715 | 672 | 271 | — | — | — |
| 14 | — | — | — | — | — | — | — | — | — | 84 | 80 | 23.8 |

— Not a scheduled time point.

TABLE 9

Group 2: Mean (n = 3/time point) D9-Caffeine Concentrations in Brain Following an Oral (Gavage) Dose of D9-Caffeine to Fasted Male Sprague-Dawley Rats at a Target Dose Level of 2 mg/kg

| Time (hour) | Concentration (ng/g) | | |
|---|---|---|---|
| | Mean | SD | % CV |
| 1 | 1537 | 153 | 9.9 |
| 4 | 1643 | 80.8 | 4.9 |
| 8 | 1153 | 112 | 9.7 |
| 14 | 463 | 47.5 | 10.3 |

TABLE 10

Group 2: D9-Caffeine Concentrations in Brain Following an Oral (Gavage) Dose of D9-Caffeine to Fasted Male Sprague Dawley Rats at a Target Dose Level of 2 mg/kg

| Time Point (hour) | Concentration (ng/g) Animal No. | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| 1 | 1570 | 1370 | 1670 | — | — | — | — | — | — | — | — | — |
| 4 | — | — | — | 1570 | 1730 | 1630 | — | — | — | — | — | — |
| 8 | — | — | — | — | — | — | 1280 | 1070 | 1110 | — | — | — |
| 14 | — | — | — | — | — | — | — | — | — | 465 | 414 | 509 |

— Not a scheduled time point.

Pharmacokinetics

Mean pharmacokinetic parameter estimates for caffeine and D9-caffeine (Compound 14) following an oral dose of caffeine or D9-caffeine (Compound 14) to male Sprague-Dawley rats are reported in Table 11 for plasma and Table 12 for brain.

Following oral dose administration of caffeine at 2 mg/kg, the $T_{1/2}$, $C_{max}$ and $AUC_{last}$ in plasma were 1.9 hr, 2600 ng/mL and 16000 hr*ng/mL, respectively. Following oral dose administration of D9-caffeine (Compound 14) at 2 mg/kg, the $T_{1/2}$, $C_{max}$ and $AUC_{last}$ in plasma were 5 hr, 2400 ng/mL and 22000 hr*ng/mL, respectively. D9-caffeine (Compound 14) provided a higher AUC exposure and a longer half-life than a corresponding dose of caffeine in plasma.

Due to differences in the molecular weights of caffeine (MW=195.1) and D9-caffeine (MW=204.1), fewer molecules of D9-caffeine were administered at a 2 mg/kg dose level than caffeine. Molecular weight corrected $C_{max}$, $AUC_{last}$ and $AUC_{inf}$ values in plasma are presented in Table 13 to enable comparison between caffeine and D9-caffeine (Compound 14). While plasma $C_{max}$ values were similar between D9-caffeine (Compound 14) and caffeine ($C_{max,corr}$ ratio of 0.97), total systemic exposure ($AUC_{inf}$) to D9-caffeine (Compound 14) was approximately 77% higher ($AUC_{inf,corr}$ ratio of 1.77).

Following oral dose administration of caffeine at 2 mg/kg, the $C_{max}$ and $AUC_{last}$ in brain were 1900 ng/mL and 11000 hr*ng/mL, respectively. Following oral dose administration of D9-caffeine (Compound 14) at 2 mg/kg, the $C_{max}$ and $AUC_{last}$ in brain were 1600 ng/mL and 16000 hr*ng/mL, respectively. As in plasma, D9-caffeine (Compound 14) provided a higher AUC exposure than a corresponding dose of caffeine in brain. The brain/plasma $AUC_{last}$ ratios were similar and were 0.69 and 0.73 for caffeine and D9-caffeine (Compound 14), respectively.

Molecular weight corrected $C_{max}$ and $AUC_{last}$ values in brain are presented in Table 14. Brain $C_{max}$ values were slightly lower for D9-caffeine (Compound 14) than caffeine ($C_{max,corr}$ ratio of 0.88) although these differences may have been related to the low number of time points evaluated and differences in $T_{max}$. However, total brain exposure ($AUC_{last,corr}$) to D9-caffeine (Compound 14) was approximately 52% higher than caffeine ($AUC_{last,corr}$ ratio of 1.52).

TABLE 11

Plasma Pharmacokinetic Parameters for Caffeine and D9-Caffeine Following Oral (Gavage) Administration of Caffeine or D9-Caffeine to Fasted Male Sprague Dawley Rats at a Target Dose Level of 2 mg/kg

| Group No. | Test Article | $T_{1/2}$ (hour) | $T_{max}$ (hour) | $C_{max}$ (ng/mL) | $AUC_{last}$ (hr · ng/mL) | $AUC_{inf}$ (hr * ng/mL) |
|---|---|---|---|---|---|---|
| 1 | Caffeine | 1.9 | 1 | 2600 | 16000 | 16000 |
| 2 | D9-Caffeine | 5 | 3 | 2400 | 22000 | 27000 |

$T_{1/2}$ Terminal half life
$T_{max}$ The time of peak concentration
$C_{max}$ The peak or maximum concentration
$AUC_{last}$ Computed from time zero to the time of the last positive Y value
$AUC_{inf}$ Area under a concentration of analyte vs time calculated using zero to infinity

TABLE 12

Brain Pharmacokinetic Parameters for Caffeine and D9-Caffeine Following Oral (Gavage) Administration of Caffeine or D9-Caffeine to Fasted Male Sprague Dawley Rats at a Target Dose Level of 2 mg/kg

| Group No. | Test Article | $T_{max}$ (hour) | $C_{max}$ (ng/mL) | $AUC_{last}$ (hr · ng/mL) | $AUC_{inf}$ (hr * ng/mL) | Ratio Brain/Plasma Cmax | Ratio Brain/Plasma $AUC_{last}$ |
|---|---|---|---|---|---|---|---|
| 1 | Caffeine | 1 | 1900 | 11000 | 11000 | 0.73 | 0.69 |
| 2 | D9-Caffeine | 4 | 1600 | 16000 | NR | 0.67 | 0.73 |

NR Not reported due to insufficient characterization of the terminal phase of the plasma-concentration profile
$T_{max}$ The time of peak concentration
$C_{max}$ The peak or maximum concentration
$AUC_{last}$ Computed from time zero to the time of the last positive Y value
$AUC_{inf}$ Area under a concentration of analyte vs time calculated using zero to infinity

TABLE 13

Molecular Weight Corrected Plasma Pharmacokinetic Parameters for Caffeine and D9-Caffeine Following Oral (Gavage) Administration of Caffeine or D9-Caffeine to Fasted Male Sprague Dawley Rats at a Target Dose Level of 2 mg/kg

| Group No. | Test Article | $C_{max,corr}$ (ng/mL) | $C_{max}$ Ratio | $AUC_{last,corr}$ (hr · ng/mL) | $AUC_{last}$ Ratio | $AUC_{inf,corr}$ (hr * ng/mL) | $AUC_{inf}$ Ratio |
|---|---|---|---|---|---|---|---|
| 1 | Caffeine | 2486 | | 15296 | | 15296 | |
| 2 | D9-Caffeine | 2400 | 0.97 | 22000 | 1.44 | 27000 | 1.77 |

$C_{max,corr}$ The peak or maximum concentration corrected for the molecular weight differences between the molecules (caffeine values multiplied by 0.956)
Ratio Ratio of D9-caffeine/molecular weight corrected caffeine value
$AUC_{last,corr}$ Computed from time zero to the time of the last positive Y value corrected for the molecular weight differences between the molecules (caffeine values multiplied by 0.956)
$AUC_{inf,corr}$ Area under a concentration of analyte vs time calculated using zero to infinity corrected for the molecular weight differences between the molecules (caffeine values multiplied by 0.956)

TABLE 14

Molecular Weight Corrected Brain Pharmacokinetic Parameters for Caffeine and D9-Caffeine Following Oral (Gavage) Administration of Caffeine or D9-Caffeine to Fasted Male Sprague Dawley Rats at a Target Dose Level of 2 mg/kg

| Group No. | Test Article | $C_{max,corr}$ (ng/mL) | $C_{max}$ Ratio | $AUC_{last,corr}$ (hr · ng/mL) | $AUC_{last}$ Ratio |
|---|---|---|---|---|---|
| 1 | Caffeine | 1816 | | 10516 | |
| 2 | D9-Caffeine | 1600 | 0.88 | 16000 | 1.52 |

$C_{max,corr}$ The peak or maximum concentration corrected for the molecular weight differences between the molecules (caffeine values multiplied by 0.956)
Ratio Ratio of D9-caffeine/molecular weight corrected caffeine value
$AUC_{last,corr}$ Computed from time zero to the time of the last positive Y value corrected for the molecular weight differences between the molecules (caffeine values multiplied by 0.956)

EQUIVALENTS AND SCOPE

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or all of the group members are present in, employed in, or otherwise relevant to a given product or process.

Furthermore, the invention encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the invention, or aspects of the invention, is/are referred to as comprising particular elements and/or features, certain embodiments of the invention or aspects of the invention consist, or consist essentially of, such elements and/or features. For purposes of simplicity, those embodiments have not been specifically set forth in haec verba herein. It is also noted that the terms "comprising," "including," and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the invention, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the instant specification, the specification shall control. In addition, any particular embodiment of the present invention that falls within the prior art may be explicitly excluded from any one or more of the claims. Because such embodiments are deemed to be known to one of ordinary skill in the art, they may be excluded even if the exclusion is not set forth explicitly herein. Any particular embodiment of the invention can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present invention, as defined in the following claims.

What is claimed is:

1. A beverage comprising water and a compound of Formula (I):

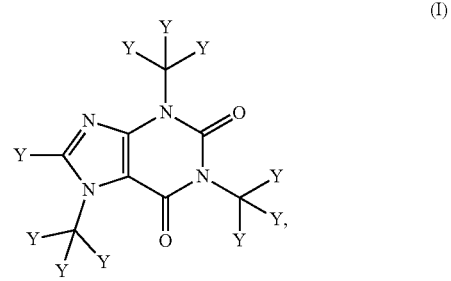

or a pharmaceutically or nutraceutically acceptable salt thereof;
wherein each Y is independently hydrogen or deuterium; at least three Y atoms are deuterium; and
the beverage comprises about 1 mg to about 10,000 mg of the compound of Formula (I).

2. The beverage of claim 1, wherein the beverage further comprises one or more of a flavoring and a sweetener.

3. The beverage of claim 1, wherein the beverage further comprises one or more of vitamins, minerals, co-factors, proteins, lipids, peptides, and amino acids.

4. The beverage of claim 1, wherein the beverage is an energy beverage.

5. The beverage of claim 3, wherein the beverage is a vitamin water.

6. The beverage of claim 4, wherein the energy beverage further comprises one or more of water, taurine, citicoline, vitamin B6, vitamin B12, folic acid, niacinamide, glucuronolactone, N-acetyl-L-tyrosine, L-phenylalanine, and malic acid.

7. The beverage of claim 5, wherein the vitamin water further comprises one or more of water, vitamin C, vitamin B5, vitamin B6, vitamin B12, magnesium, and pantothenic acid.

8. The beverage of claim 1, wherein the beverage comprises about 1 mg to about 400 mg of the compound of Formula (I), or a pharmaceutically or nutraceutically acceptable salt thereof.

9. The beverage of claim 1, wherein the beverage comprises about 1 mg to about 125 mg of the compound of Formula (I), or a pharmaceutically or nutraceutically acceptable salt thereof.

10. The beverage of claim 1, wherein the beverage comprises about 5 mg to about 75 mg of the compound of Formula (I), or a pharmaceutically or nutraceutically acceptable salt thereof.

11. The beverage of claim 1, wherein the compound is selected from the group consisting of:

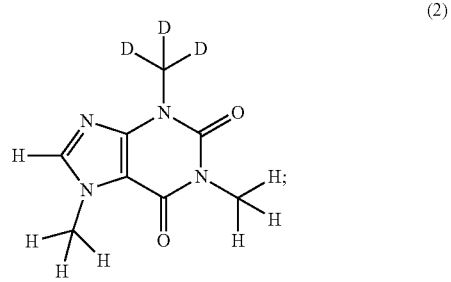

(3)
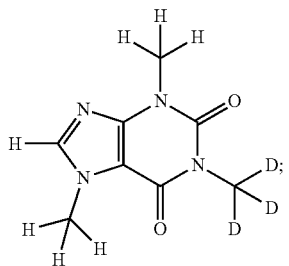
(4)
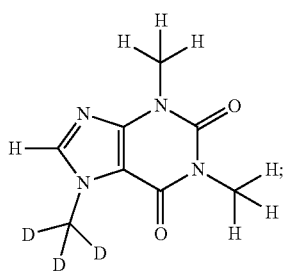
(5)
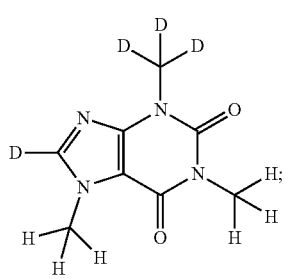
(6)
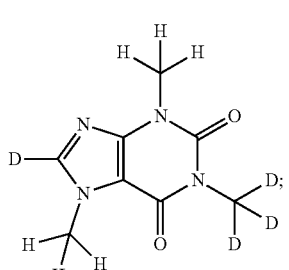
(7)
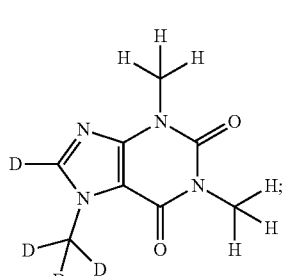
(8)
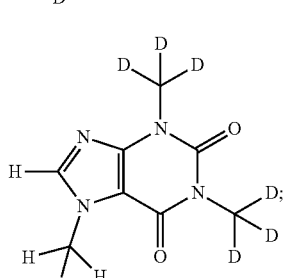
(9)
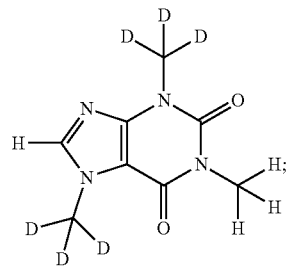
(10)
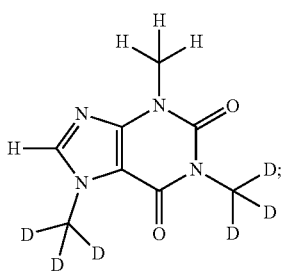
(11)
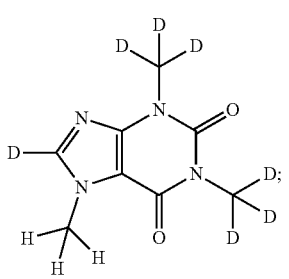
(12)
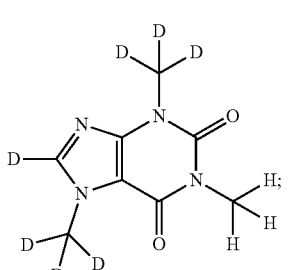
(13)
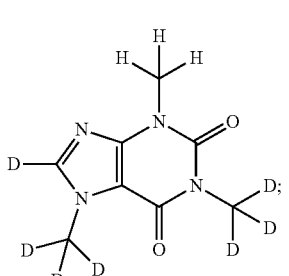
(14)

(15)

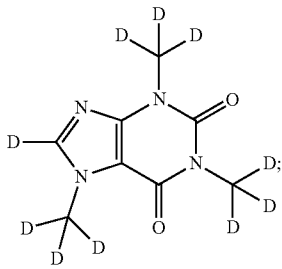

or a pharmaceutically or nutraceutically acceptable salt thereof.

12. The beverage of claim 1, wherein the compound is (14)

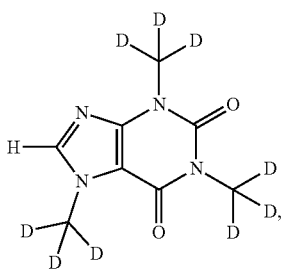

or a pharmaceutically or nutraceutically acceptable salt thereof.

13. The beverage of claim 1, such that the maximum plasma concentration ($C_{max}$) of the compound of Formula (I) after consumption of the beverage is substantially similar to or lower than that of non-isotopically enriched caffeine at an equivalent dose.

14. The beverage of claim 1, such that the maximum plasma concentration ($C_{max}$) of the compound of Formula (I) after consumption of the beverage is at least 25% lower than that of non-isotopically enriched caffeine at an equivalent dose.

15. The beverage of claim 1, such that the maximum plasma concentration ($C_{max}$) of the compound of Formula (I) after consumption of the beverage is at least 50% lower than that of non-isotopically enriched caffeine at an equivalent dose.

16. The beverage of claim 1, such that the time of maximum plasma concentration ($T_{max}$) of the compound of Formula (I) after consumption of the beverage is at least 10% longer than that of non-isotopically enriched caffeine at an equivalent dose.

17. The beverage of claim 1, such that the time of maximum plasma concentration ($T_{max}$) of the compound of Formula (I) after consumption of the beverage is at least 25% longer than that of non-isotopically enriched caffeine at an equivalent dose.

18. The beverage of claim 1, such that the time of maximum plasma concentration ($T_{max}$) of the compound of Formula (I) after consumption of the beverage is at least 50% longer than that of non-isotopically enriched caffeine at an equivalent dose.

19. The beverage of claim 1, such that the side effects are reduced relative to the consumption of non-isotopically enriched caffeine at an equivalent dose;
wherein the side effect is anxiety, insomnia, gastrointestinal issues, rhabdomyolysis, addiction, hypertension, rapid heart rate, atrial fibrillation, fatigue, irritability, nervousness, restlessness, nausea, or muscle tremors.

20. The beverage of claim 1, such that the maximum concentration ($C_{max}$) of the compound of Formula (I) in the central nervous system after consumption of the beverage is substantially similar to that of non-isotopically enriched caffeine at an equivalent dose.

21. The beverage of claim 1, such that the maximum concentration ($C_{max}$) of the compound of Formula (I) in the central nervous system after consumption of the beverage is at least 10% lower than that of non-isotopically enriched caffeine at an equivalent dose.

22. The beverage of claim 1, such that the maximum concentration ($T_{max}$) of the compound of Formula (I) in the central nervous system after consumption of the beverage is at least 10% longer than that of non-isotopically enriched caffeine at an equivalent dose.

23. The beverage of claim 1, such that the maximum concentration ($T_{max}$) of the compound of Formula (I) in the central nervous system after consumption of the beverage is at least 25% longer than that of non-isotopically enriched caffeine at an equivalent dose.

* * * * *

UNITED STATES PATENT AND TRADEMARK OFFICE
CERTIFICATE OF CORRECTION

PATENT NO. : 10,582,716 B1
APPLICATION NO. : 16/452316
DATED : March 10, 2020
INVENTOR(S) : Bradford C. Sippy Page 1 of 1

It is certified that error appears in the above-identified patent and that said Letters Patent is hereby corrected as shown below:

In the Claims

In Claim 22, at Column 78, Line 35, the text:
"The beverage of claim 1, such that the maximum"
Should be replaced with:
-- The beverage of claim 1, such that the time of maximum --.

In Claim 23, at Column 78, Line 40, the text:
"The beverage of claim 1, such that the maximum"
Should be replaced with:
-- The beverage of claim 1, such that the time of maximum --.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*